US008199344B2

(12) United States Patent
Hoshino

(10) Patent No.: US 8,199,344 B2

(45) Date of Patent: Jun. 12, 2012

(54) IMAGE FORMING APPARATUS FOR PERFORMING A CORRECTION PROCESS AND INCREASING THE SPECIFIC PORTION'S LENGTH OF A DASHED LINE UP TO A SPECIFIC LENGTH WHEN IT IS SMALLER THAN THE SPECIFIC LENGTH

(75) Inventor: Tomokazu Hoshino, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1155 days.

(21) Appl. No.: 12/068,980

(22) Filed: Feb. 14, 2008

(65) Prior Publication Data

US 2008/0204769 A1 Aug. 28, 2008

(30) Foreign Application Priority Data

Feb. 22, 2007 (JP) ................................. 2007-041565

(51) Int. Cl.
*G06F 3/12* (2006.01)

(52) U.S. Cl. ......... 358/1.15; 358/1.1; 358/1.2; 345/660; 345/667; 345/670

(58) Field of Classification Search ................. 358/1.15, 358/1.2, 1.1
See application file for complete search history.

(56) References Cited

U.S. PATENT DOCUMENTS

| | | | | |
|---|---|---|---|---|
| 5,613,017 | A * | 3/1997 | Rao et al. | 382/174 |
| 6,437,876 | B1 * | 8/2002 | Phang et al. | 358/1.2 |
| 2002/0186219 | A1 * | 12/2002 | Nishi | 345/443 |
| 2005/0206937 | A1 * | 9/2005 | Hirabayashi | 358/1.13 |
| 2006/0017758 | A1 * | 1/2006 | Nambudiri et al. | 347/14 |
| 2007/0052747 | A1 * | 3/2007 | Kim | 347/19 |

FOREIGN PATENT DOCUMENTS

| | | |
|---|---|---|
| JP | 08-118703 | 5/1996 |

* cited by examiner

*Primary Examiner* — Benny Q Tieu
*Assistant Examiner* — Martin Mushambo
(74) *Attorney, Agent, or Firm* — Kubotera & Associates, LLC

(57) ABSTRACT

An image forming apparatus includes a data receiving unit for receiving print data from a host device; a job control unit for controlling edition, expansion, and print control of the image data; a data edition unit for editing the print data; a data expansion unit for receiving an analytical result from the data edition unit and generating print image data; and a print control unit for receiving the print image data and controlling a printing unit to perform a printing operation. The data edition unit determines whether a dashed line drawing command exists. When the dashed line drawing command exists, the data edition unit determines a length of a specific portion of a dashed line. When the length of the specific portion is smaller than a specific length, the data edition unit performs a correction process and increases the length of the specific portion up to the specific length.

7 Claims, 25 Drawing Sheets

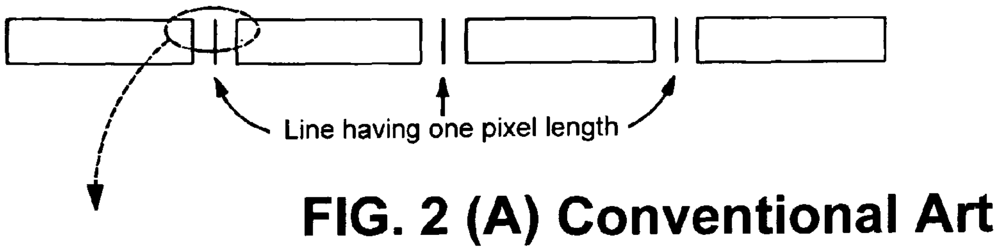
FIG. 2 (A) Conventional Art
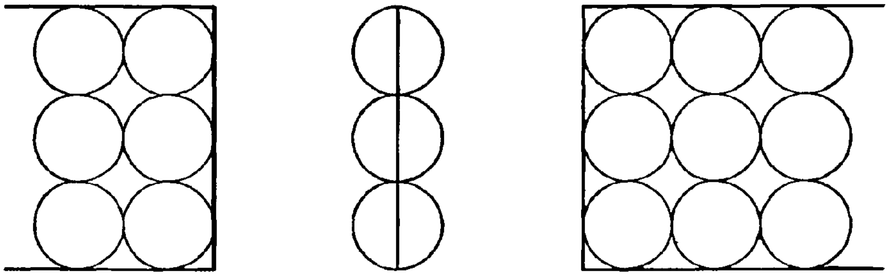
FIG. 2 (B) Conventional Art
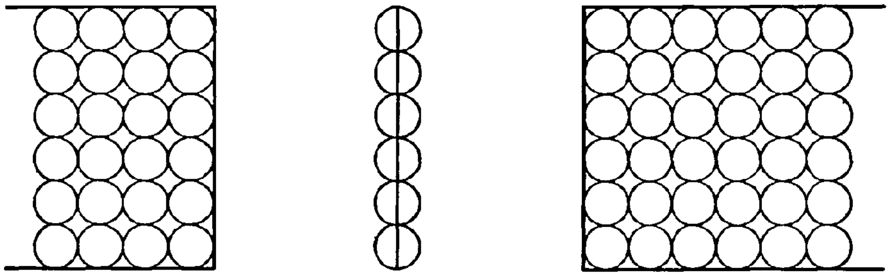
FIG. 2 (C) Conventional Art
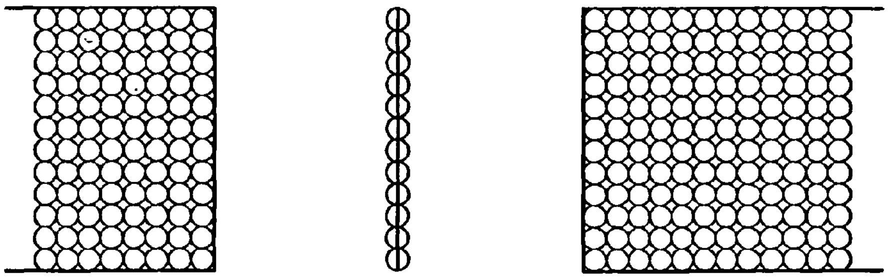
FIG. 2 (D) Conventional Art

IMAGE FORMING APPARATUS FOR PERFORMING A CORRECTION PROCESS AND INCREASING THE SPECIFIC PORTION'S LENGTH OF A DASHED LINE UP TO A SPECIFIC LENGTH WHEN IT IS SMALLER THAN THE SPECIFIC LENGTH

BACKGROUND OF THE INVENTION AND RELATED ART STATEMENT

The present invention relates to an image forming apparatus. More specifically, the present invention relates to an image forming apparatus capable of drawing a fine line through a correction process.

In a conventional image forming apparatus, a fine line is drawn based on a width or a length of one pixel according to a set output resolution. With recent technological advancement, a resolution of an image forming apparatus has increased from about 300 to 600 dpi (dot per inch) to 1200 to 2400 dpi, thereby making it possible to obtain a resolution with higher precision. Further, Patent Reference has disclosed a technology for forming an image suitable for a fine line through controlling a pulse number.

Patent Reference: Japanese Patent Publication No. 08-118703

In the conventional image forming apparatus, when the resolution increases, it is difficult to draw a line having one pixel length. Even when such a line is drawn, it is difficult to visually recognize the line. For example, when a fine line is drawn at the resolution of 600 dpi, one pixel has a size of about 0.04 mm. In this case, it is possible to visually recognize the fine line. When a fine line is drawn at the resolution of 1200 dpi, one pixel has a size a half of that of 600 dpi. When a fine line is drawn at the resolution of 2400 dpi, one pixel has a size a quarter of that of 600 dpi. Accordingly, depending on an apparatus, it is difficult to arrange dots due to a small width of a line. Even when such a line is drawn, it is difficult to visually recognize the line.

FIGS. 2(*a*) to 2(*d*) are schematic views showing lines drawn with a conventional image forming apparatus. FIG. 2(*a*) is a schematic view showing a line having one pixel length drawn according to a dashed line drawing command. FIG. 2(*b*) is a schematic enlarged view showing a line having one pixel length drawn at a resolution of 600 dpi. FIG. 2(*c*) is a schematic enlarged view showing a line having one pixel length drawn at a resolution of 1200 dpi. FIG. 2(*d*) is a schematic enlarged view showing a line having one pixel length drawn at a resolution of 2400 dpi.

As shown in FIG. 2(*a*), a dashed line including the lines having one pixel length is drawn. When the dashed line is drawn at the resolution of 600 dpi, the line having one pixel length shown in FIG. 2(*b*) is printed.

When the dashed line is drawn at the resolution of 1200 dpi, the line having one pixel length shown in FIG. 2(*c*) is printed. In this case, the line having one pixel length has a width a half of that of 600 dpi. When the dashed line is drawn at the resolution of 2400 dpi, the line having one pixel length shown in FIG. 2(*d*) is printed. In this case, the line having one pixel length has a width a half of that of 1200 dpi, or a quarter of that of 600 dpi.

Accordingly, when the resolution increases, it is difficult to draw the line having one pixel length. Even when such a line is drawn, it is difficult to visually recognize the line.

In the view of the problems described above, an object of the present invention is to provide an image forming apparatus capable of solving the problems of the conventional image forming apparatus. In the image forming apparatus, a length of a specific portion of a dashed line is determined. When the length of the specific portion is smaller than a specific length, a correction process is performed, so that the length of the specific portion is extended up to the specific length. Accordingly, when a dashed line including a line portion having one pixel length, it is possible to print and make the line portion having one pixel length visually recognizable.

Further objects and advantages of the invention will be apparent from the following description of the invention.

SUMMARY OF THE INVENTION

In order to attain the objects described above, according to the present invention, an image forming apparatus includes a data receiving unit for receiving print data from a host device; a job control unit for controlling edition, expansion, and print control of the image data received with the data receiving unit; a data edition unit for editing the print data; a data expansion unit for receiving an analytical result from the data edition unit and generating print image data; and a print control unit for receiving the print image data generated with the data expansion unit and controlling a printing unit to perform a printing operation. The data edition unit determines whether a dashed line drawing command exists. When the dashed line drawing command exists, the data edition unit determines a length of a specific portion of a dashed line. When the length of the specific portion is smaller than a specific length, the data edition unit performs a correction process and increases the length of the specific portion up to the specific length.

In the present invention, when the dashed line drawing command exists, the data edition unit determines the length of the specific portion of the dashed line. When the length of the specific portion is smaller than the specific length, the data edition unit performs the correction process and increases the length of the specific portion up to the specific length. Accordingly, when the image forming apparatus prints the dashed line including the portion having one pixel length at a high resolution, it is possible to print and make the portion having one pixel length visually recognizable.

BRIEF DESCRIPTION OF THE DRAWINGS

FIGS. 2(*a*) to 2(*d*) are schematic views showing lines drawn with a conventional image forming apparatus, wherein FIG. 2(*a*) is a schematic view showing a line having one pixel length drawn according to a dashed line drawing command, FIG. 2(*b*) is a schematic enlarged view showing a line having one pixel length drawn at a resolution of 600 dpi, FIG. 2(*c*) is a schematic enlarged view showing a line having one pixel length drawn at a resolution of 1200 dpi, and FIG. 2(*d*) is a schematic enlarged view showing a line having one pixel length drawn at a resolution of 2400 dpi;

DETAILED DESCRIPTION OF THE PREFERRED EMBODIMENTS

Hereunder, embodiments of the present invention will be explained with reference to the accompanying drawings.

First Embodiment

Figure 1:
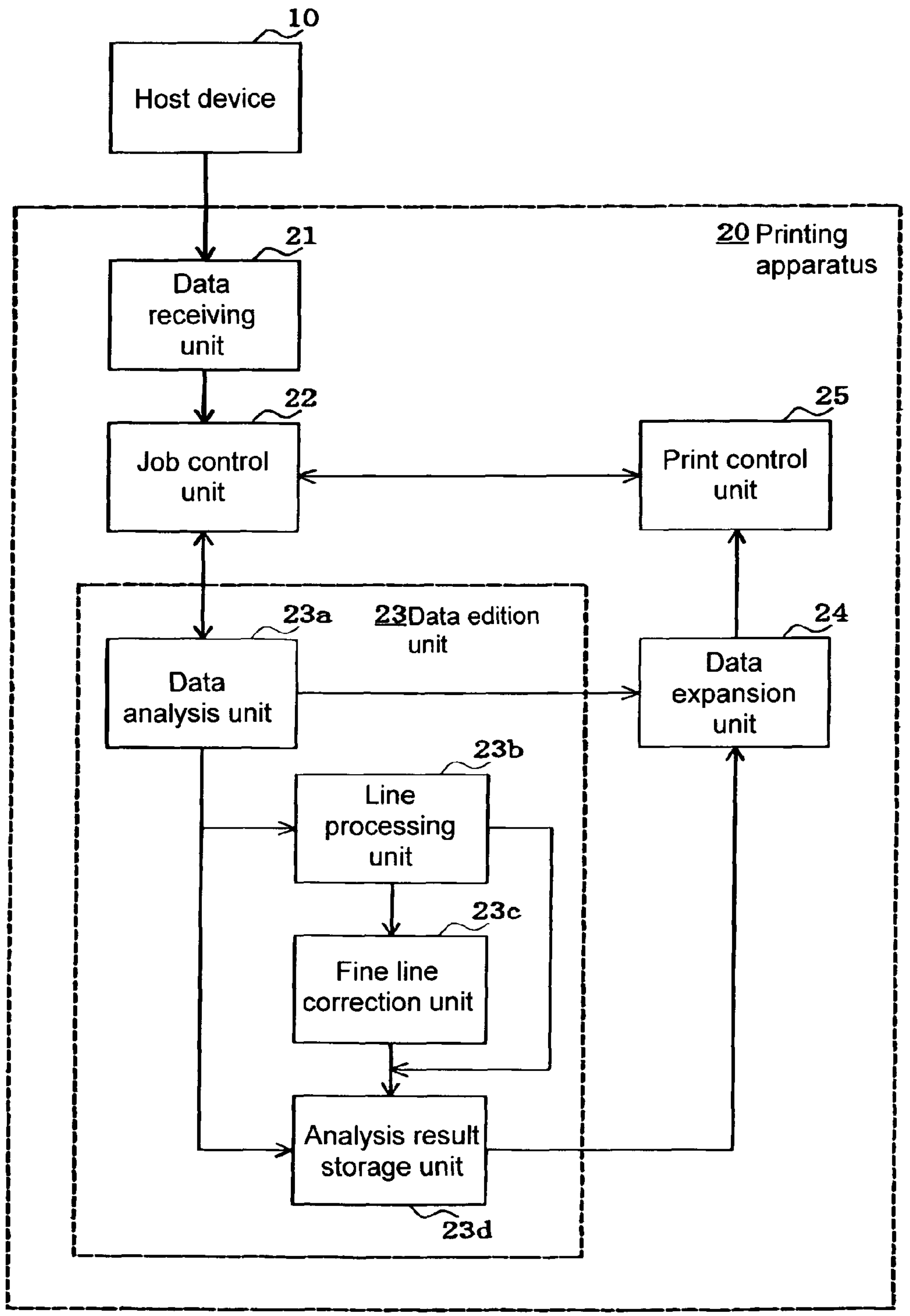
FIG. 1 is a block diagram showing a configuration of a printing apparatus according to a first embodiment of the present invention.

A first embodiment of the present invention will be explained. FIG. 1 is a block diagram showing a configuration of a printing apparatus 20 as an image forming apparatus according to the first embodiment of the present invention.

As shown in FIG. 1, the printing apparatus 20 is connected to a host device 10 through a communication means such as a cable, a network, and the likes. In the embodiment, the printing apparatus 20 may be an ink-jet printer, an electro-photography printer, a copier, a facsimile, an image reading apparatus, a multi-function product having functions of a printer, a facsimile, and a copier, and the likes. Further, the printing apparatus 20 may be a monochrome printer or a color printer.

In the embodiment, the host device 10 may be a computer such as a personal computer, a server, and the likes. The computer may include a processing unit such as a CPU, an MPU, and the likes; a storage unit such as a magnetic disk, a semiconductor memory, and the likes; an input unit such as a keyboard, a mouse, a touch panel, and the likes; and a display unit such as a CRT, a liquid crystal display, and the likes. The host device 10 may include any devices capable of generating print data to be printed with the printing apparatus 20.

In the embodiment, the printing apparatus 20 includes a data receiving unit 21; a job control unit 22; a data edition unit 23; a data expansion unit 24; and a print control unit 25. The data edition unit 23 includes a data analysis unit 23*a*; a line processing unit 23*b*; a fine line correction unit 23*c*; and an analysis result storage unit 23*d*.

In the embodiment, the data receiving unit 21 receives print data sent from the host device 10, and sends the print data thus received to the job control unit 22. Further, the job control unit 22 requests the data edition unit 23 to edit the print data sent from the data receiving unit 21, and sends a command to the print control unit 25 to perform a printing operation.

In the embodiment, the data analysis unit 23*a* of the data edition unit 23 analyzes the print data thus received. When the printing apparatus 20 prints a line, the data analysis unit 23*a* calculates coordinates of a start point and an end point of the line, and determines whether the line is a dashed line or a solid line. When the line is a dashed line, the data analysis unit 23*a* divides the line. When the line is a dashed line including a fine line, the data analysis unit 23*a* sends a command to the fine line correction unit 23*c* to perform correction. Then, the analysis result storage unit 23*d* stores an analysis result.

In the embodiment, the data expansion unit 24 receives the analysis result and line data thus corrected from the analysis result storage unit 23*d*, and generates print image data to be sent to the print control unit 25 accordingly. Then, the print control unit 25 performs a printing operation of the print image data sent from the data expansion unit 24.

Figure 3:
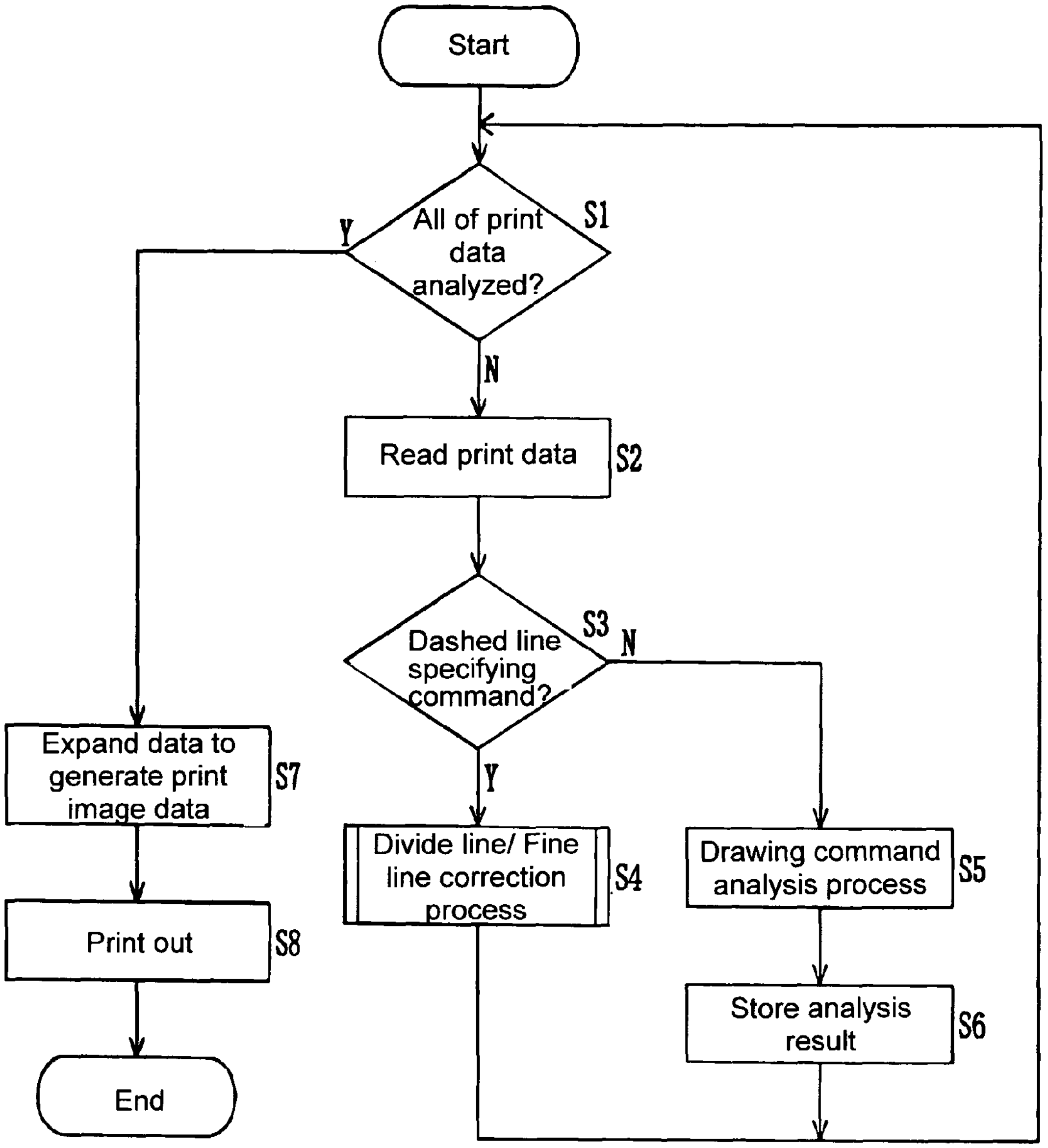
FIG. 3 is a flowchart showing an operation of a data edition unit and a data expansion unit according to the first embodiment of the present invention.

An operation of the printing apparatus 20 will be explained next. FIG. 3 is a flowchart showing an operation of the data edition unit 23 and the data expansion unit 24 according to the first embodiment of the present invention.

First, the host device 10 sends the print data to the printing apparatus 20. Then, the data receiving unit 21 of the printing apparatus 20 receives the print data, and sends the print data thus received to the job control unit 22. Accordingly, the job control unit 22 requests the data edition unit 23 to analyze the print data thus received.

The operation of the data edition unit 23 and the data expansion unit 24 will be explained next. First, the data analysis unit 23*a* determines whether all of the print data thus received are analyzed. When all of the print data are not analyzed, the data analysis unit 23*a* reads the print data thus received per command.

In the next step, the data analysis unit 23*a* determines whether a command included in the print data thus read is a dashed line specifying command. For example, the data analysis unit 23*a* determines whether the command is an "LT" command. When the command is the dashed line specifying command, a process of dividing a line and a fine line correction process are performed.

In the next step, the line processing unit 23*b* determines whether a fine line necessary to be divided into a dashed line and for correction exists, so that the fine line correction unit 23*c* performs correction of the fine line, and the analysis result storage unit 23*d* stores an analysis result. When the command is not the dashed line specifying command, the data analysis unit 23*a* performs a drawing command analysis process per command, and the analysis result storage unit 23*d* stores an analysis result. Accordingly, when the command thus received is analyzed, intermediate code format data are stored in the analysis result storage unit 23*d*.

In the next step, the data analysis unit 23*a* determines one more time whether all of the print data thus received are analyzed. When all of the print data are not analyzed, the data analysis unit 23*a* repeats the steps described above until all of the print data are analyzed. When all of the print data are analyzed, the data expansion unit 24 receives the analysis result of line data thus analyzed and the print data from the analysis result storage unit 23*d*, and expands the data to generate the print image data. That is, the data expansion unit 24 expands the intermediate code format data and generates bit map image data therefrom. The print image data is sent to the print control unit 25, thereby performing the printing operation.

The flowchart shown in FIG. 3 will be explained. In step S1, it is determined whether all of the print data are analyzed. When it is determined that all of the print data are analyzed, the process proceeds to step S7. When it is determined that all of the print data are not analyzed, the process proceeds to step S2.

In step S2, the print data are read per command. In step S3, it is determined whether the command included in the print data is the dashed line specifying command. When it is determined that the command included in the print data is the dashed line specifying command, the process proceeds to step S4. When it is determined that the command included in the print data is not the dashed line specifying command, the process proceeds to step S5.

In step S4, the process of dividing the line and the fine line correction process are performed. In step S5, the drawing command analysis process is performed per command. In step S6, the analysis result is stored. In step S7, the data are expanded to generate the print image data. In step S8, the printing operation is performed, thereby completing the process.

Figure 4:
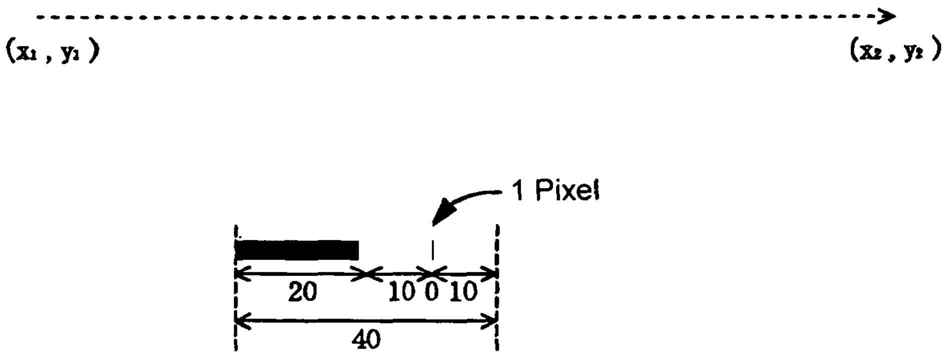
FIGS. 4(*a*) and 4(*b*) are schematic views showing lines drawn with the printing apparatus according to the first embodiment of the present invention, wherein FIG. 4(*a*) is a view showing information necessary for dividing a line, and FIG. 4(*b*) is a view showing a line divided into a dashed line.
Figure 4:
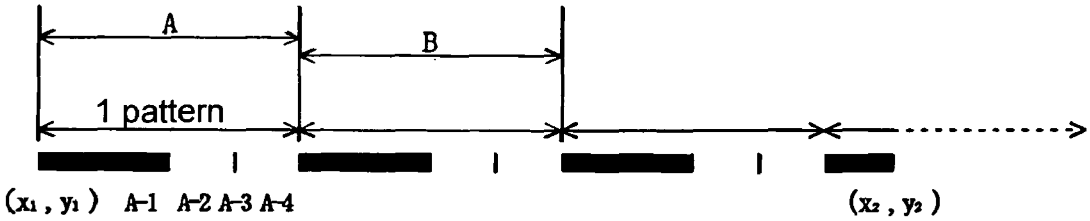
Figure 5:
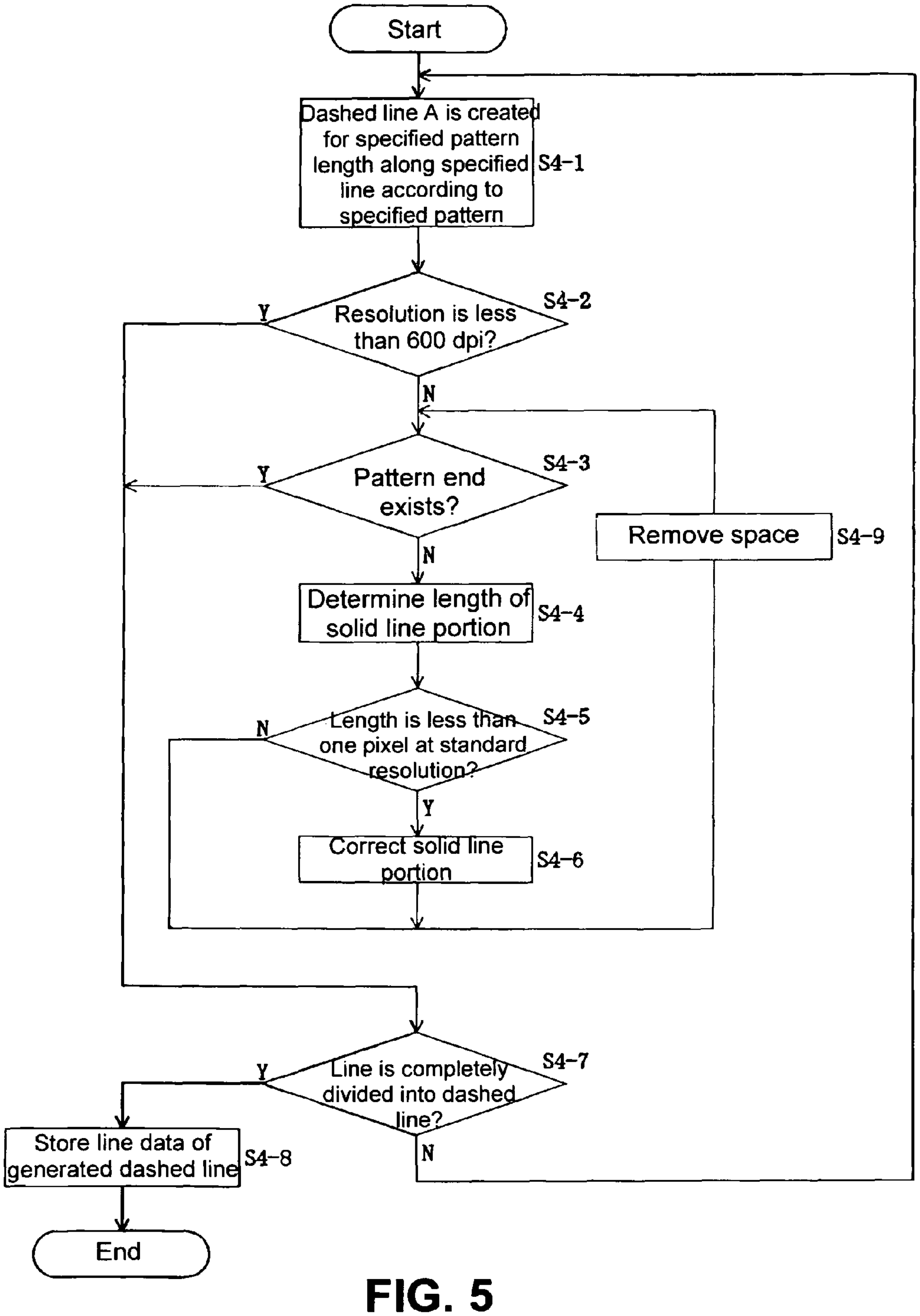
FIG. 5 is a flowchart showing a sub-routine of dividing a line and a fine line correction process according to the first embodiment of the present invention.

An operation of dividing the line and the fine line correction process will be explained next. FIGS. 4(*a*) and 4(*b*) are schematic views showing lines drawn with the printing apparatus according to the first embodiment of the present invention. More specifically, FIG. 4(*a*) is a view showing information necessary for dividing the line, and FIG. 4(*b*) is a view showing a line divided into a dashed line. FIG. 5 is a flowchart showing a sub-routine of dividing the line and the fine line correction process according to the first embodiment of the present invention.

When the line is divided into the dashed line, the information shown in FIG. 4(*a*) is necessary. More specifically, the information includes a coordinate of a starting point of the line (x1, y1); a coordinate of an end point of the line (x2, y2); a length of one dashed line pattern to be applied to the line; and a ratio of a solid line and a space of the dashed line pattern. In FIG. 4(*a*), for example, the length of one dashed line pattern is 40, and the dashed line pattern is defined as 50% of the solid line, 25% of the space, 0% of the solid line, and 25% of the space. A fine line is printed in a portion corresponding to 0% of the solid line with one pixel according to an output resolution of the printing apparatus 20.

FIG. 4(*b*) is a view showing the line divided into the dashed line. In the example shown in FIG. 4(*b*), the dashed line pattern shown in FIG. 4(*a*) is aligned from the coordinate of the starting point to the coordinate of the end point. The dashed line pattern beyond the coordinate of the end point is not printed.

In the operation of dividing the line and the fine line correction process, first, a dashed line A (B) is created for a specified pattern length along the line thus specified according to the dashed line pattern. Then, it is determined whether the resolution is less than 600 dpi. It is supposed that a standard resolution, at which one pixel length is visually recognizable, is 600 dpi.

When the resolution is not less than 600 dpi, it is determined whether a pattern end exists. That is, it is determined whether A-4 shown in FIG. 4(*b*) is completed. When it is determined that the pattern end does not exist, a length of A-1 shown in FIG. 4(*b*) is checked to determine a length of the solid line, i.e., a length of a first solid line portion of the line to be divided.

In the next step, it is determined whether the length of the solid line portion is less than one pixel at the standard resolution. More specifically, it is determined whether the length of the solid line portion is less a length or a width of one dot at 600 dpi. When the resolution is specified at 1200 dpi, it is determined whether the length of the solid line portion is less a length of two dots. When it is determined that the length of the solid line portion is less than one pixel, the solid line portion is corrected. When it is determined that the length of the solid line portion is not less than one pixel, or greater than one pixel, the solid line portion is not corrected.

In the next step, the space is removed. More specifically, in the example shown in FIG. 4(*b*), A-2 is removed. Then, it is determined one more time whether the pattern end exists. When it is determined that the pattern end does not exist, the process described above is repeated.

When it is determined that the resolution is not less than 600 dpi, and it is determined that the pattern end exists, it is determined whether the line is completely divided into the dashed line. When it is determined that the line is not completely divided, the dashed line A (B) is created one more time for the specified pattern length along the line thus specified according to the dashed line pattern, and the process described above is repeated.

When it is determined that the line is completely divided, line data of the dashed line thus generated are stored in the analysis result storage unit 23*d*. In this case, the line data of the dashed line are converted to intermediate code format data, and the intermediate code format data are stored in the analysis result storage unit 23*d*.

The flowchart shown in FIG. 5 will be explained. In step S4-1, the dashed line A (B) is created for the specified pattern length along the specified line according to the specified pattern. In step S4-2, it is determined whether the resolution is less than 600 dpi. When the resolution is less than 600 dpi, the process proceeds to step S4-7. When the resolution is not less than 600 dpi, the process proceeds to step S4-3.

In step S4-3, it is determined whether the pattern end exists. When it is determined that the pattern end exists, the process proceeds to step S4-7. When it is determined that the pattern end does not exist, the process proceeds to step S4-4. In step S4-4, the length of the solid line portion is determined.

In step S4-5, it is determined whether the length of the solid line portion is less than one pixel at the standard resolution. When it is determined that the length of the solid line portion is less than one pixel at the standard resolution, the process proceeds to step S4-6. When it is determined that the length of the solid line portion is not less than one pixel at the standard resolution, the process proceeds to step S4-7.

In step S4-6, the solid line portion is corrected. In step S4-7, it is determined whether the line is completely divided into the dashed line. When it is determined that the line is completely divided, the process proceeds to step S4-8. When it is determined that the line is not completely divided, the process returns to step S4-1. In step S4-8, the line data of the dashed line thus generated are stored, thereby completing the process. In step S4-9, the space is removed.

Figure 6:
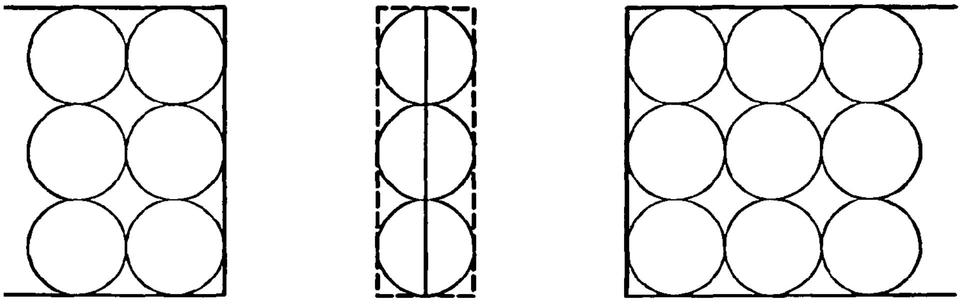
FIGS. 6(*a*) to 6(*c*) are schematic views showing a process of correcting a horizontal fine line according to the first embodiment of the present invention, wherein FIG. 6(*a*) is a view showing an actual image at a standard resolution, FIG. 6(*b*) is a view showing an actual image at the resolution of 1200 dpi, and FIG. 6(*c*) is a view showing an actual image at the resolution of 1200 dpi after correction.
Figure 6:
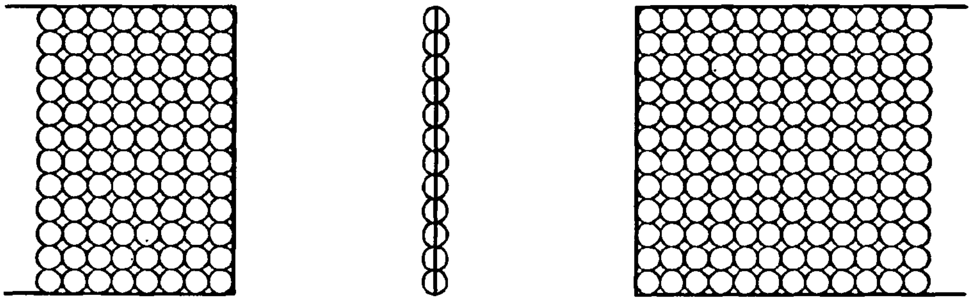
Figure 6:
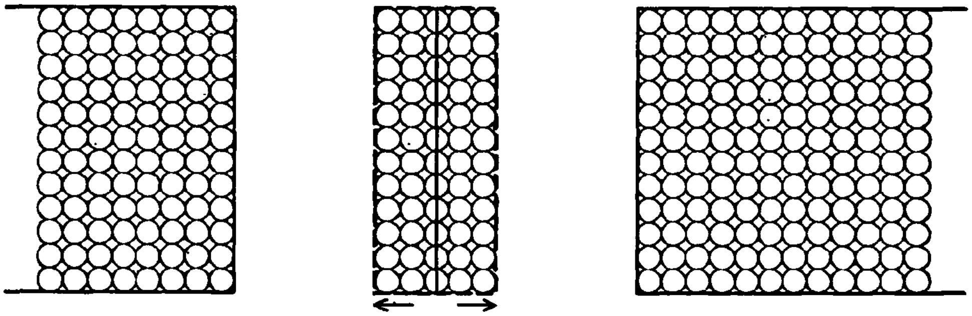

The fine line correction process will be explained in more detail. FIGS. 6(*a*) to 6(*c*) are schematic views showing a process of correcting a horizontal fine line according to the first embodiment of the present invention. More specifically, FIG. 6(*a*) is a view showing an actual image at the standard resolution, FIG. 6(*b*) is a view showing an actual image at the resolution of 1200 dpi, and FIG. 6(*c*) is a view showing an actual image at the resolution of 1200 dpi after correction.

Figure 7:
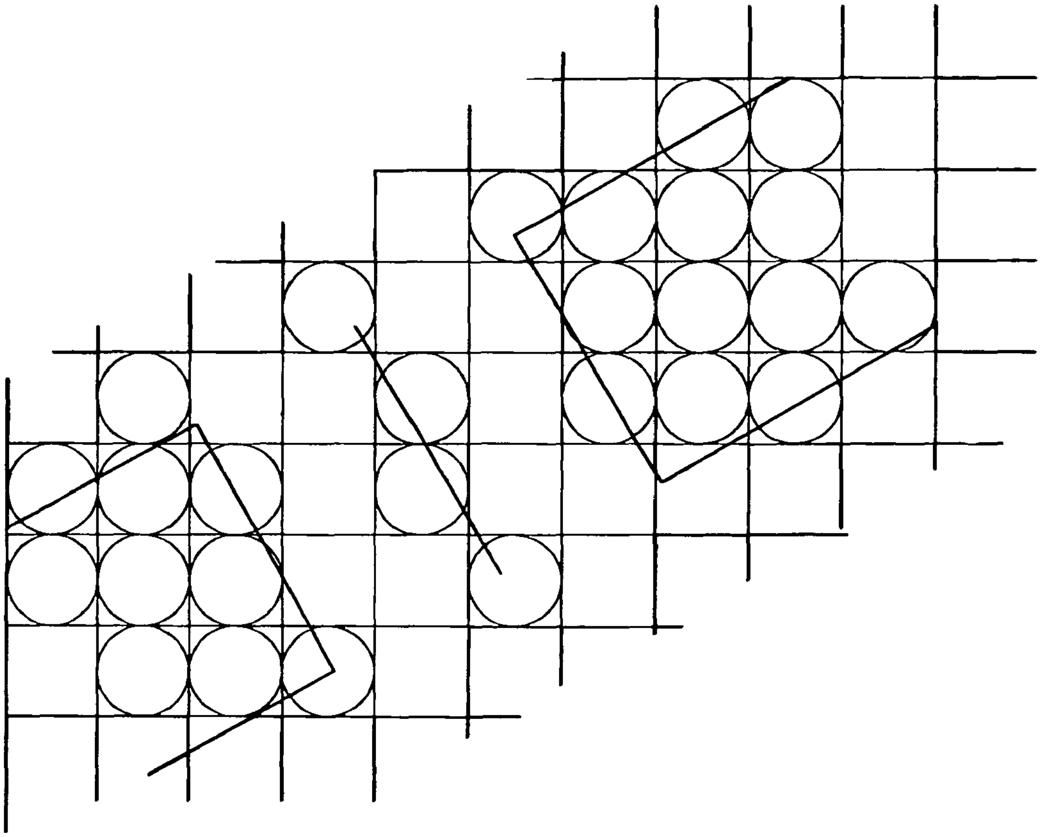
FIG. 7 is a schematic view showing an actual oblique line drawn at the resolution of 600 dpi according to the first embodiment of the present invention.
Figure 8:
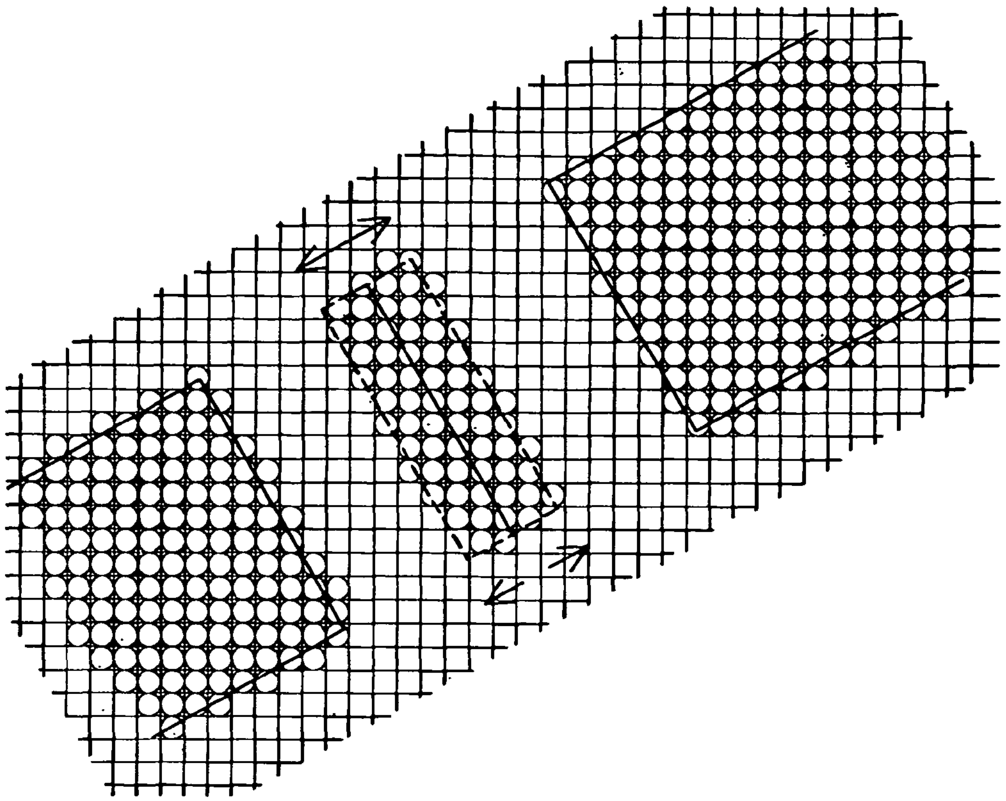
FIGS. 8(*a*) and 8(*b*) are schematic views showing a process of correcting an oblique line according to the first embodiment of the present invention, wherein FIG. 8(*a*) is a view showing an actual oblique line at the resolution of 1200 dpi after correction, and FIG. 8(*b*) is a view showing a method of calculating a coordinate upon correction.
Figure 8:
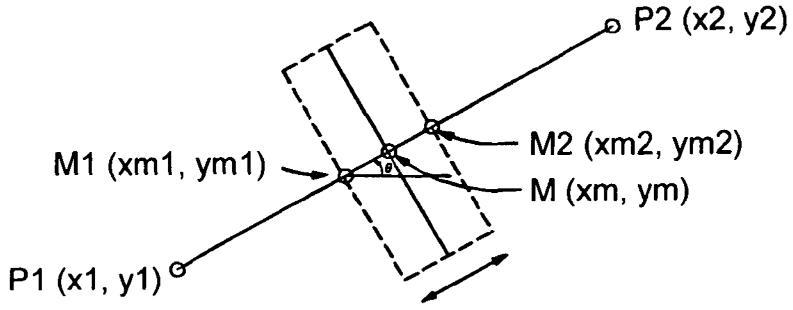

FIG. 7 is a schematic view showing an actual oblique line drawn at the resolution of 600 dpi according to the first embodiment of the present invention. FIGS. 8(*a*) and 8(*b*) are schematic views showing a process of correcting an oblique line according to the first embodiment of the present invention. More specifically, FIG. 8(*a*) is a view showing an actual oblique line at the resolution of 1200 dpi after correction, and FIG. 8(*b*) is a view showing a method of calculating a coordinate upon correction.

As shown in FIG. 6(*a*), the dashed line including a line having one pixel length is drawn at the standard resolution as an example. More specifically, in FIG. 6(*a*), the line having one pixel length corresponds to a portion circled with a dashed line at the middle.

As shown in FIG. 6(*b*), the dashed line same as that in FIG. 6(*a*) is drawn at the resolution, i.e., 2400 dpi, greater than the standard resolution. In this case, the line having one pixel length becomes too small, and it is difficult to visually recognize the line.

In the fine line correction process, a portion having a size less than four dots at the resolution of 2400 dpi, or one dot at the standard resolution, is enlarged to have a size greater than four dots at the resolution of 2400 dpi, or one dot at the standard resolution.

When the fine line correction process is performed, the line having one pixel length is enlarged as shown in FIG. 6(*c*). In an example shown in FIG. 6(*c*), the portion having a size of one dot at the resolution of 2400 dpi is enlarged to have a size equal to five dots at the resolution of 2400 dpi. In this case, the portion having a size of one dot at the resolution of 2400 dpi is enlarged by an extended portion corresponding to four dots toward both sides from the center thereof. Further, the extended portion is removed from the adjacent spaces at both sides, so that the dashed line pattern is not shifted.

As shown in FIGS. 6(*a*) to 6(*c*), the fine line correction process is applied to the horizontal line, and may be applied to an oblique line. As shown in FIG. 7, an oblique dashed line including a line having one pixel length is drawn at the standard resolution. Similar to the horizontal line, when the resolution increases, it is difficult to visually recognize the line having one pixel length in the oblique dashed line.

Accordingly, as shown in FIG. 8(*a*), the line having one pixel length is enlarged to have a size greater than one pixel at the standard resolution. When a line is corrected in a horizontal direction or a vertical direction, it is possible to correct the line through extending the line by one pixel length in a horizontal direction or a vertical direction. In a case of an oblique line, the oblique line is corrected through a calculation shown in FIG. 8(*b*).

As shown in FIG. 8(*b*), a coordinate M1 and a coordinate M2 of the line enlarged by one pixel length are calculated according to a starting point P1 of the line, an end point P2 of the line, a coordinate M of the line having one pixel length, and a correction length Ls. More specifically, an angle θ of the line is calculated from the starting point P1 and the end point P2. The angle θ is given by the following equation, $$\theta=\tan^{-1}((y2-y1)/(x2-x1))$$

where a coordinate of the starting point P1 is (x1, y1), and a coordinate of the end point P2 is (x2, y2).

Accordingly, the oblique line is enlarged from M to M1 and M2 along the angle θ by a half of the correction length Ls, respectively. When a coordinate of M is (xm, ym), the coordinates of M1 and M2 are given by the following equations, $$M1(xm-(Ls/2)\times\cos\theta,\ ym-(Ls/2)\times\sin\theta)$$

$$M2(xm+(Ls/2)\times\cos\theta,\ ym+(Ls/2)\times\sin\theta)$$

As described above, in correcting the oblique dashed line, the line having one pixel length at the position of M is enlarged to the line from M1 to M2.

In the embodiment, when the solid portion of the line divided into the dashed line has the length less than one pixel at the standard resolution, the solid portion is corrected and enlarged to have the specific length. Accordingly, when the dashed line is drawn at the high resolution, it is possible to make the portion corresponding to one pixel length visually recognizable.

Second Embodiment

A second embodiment of the invention will be described next. Components in the second embodiment similar to those in the first embodiment are designated by the same reference numerals, and explanations thereof are omitted. Further, explanations of operations and effects in the second embodiment similar to those in the first embodiment are omitted.

Figure 9:
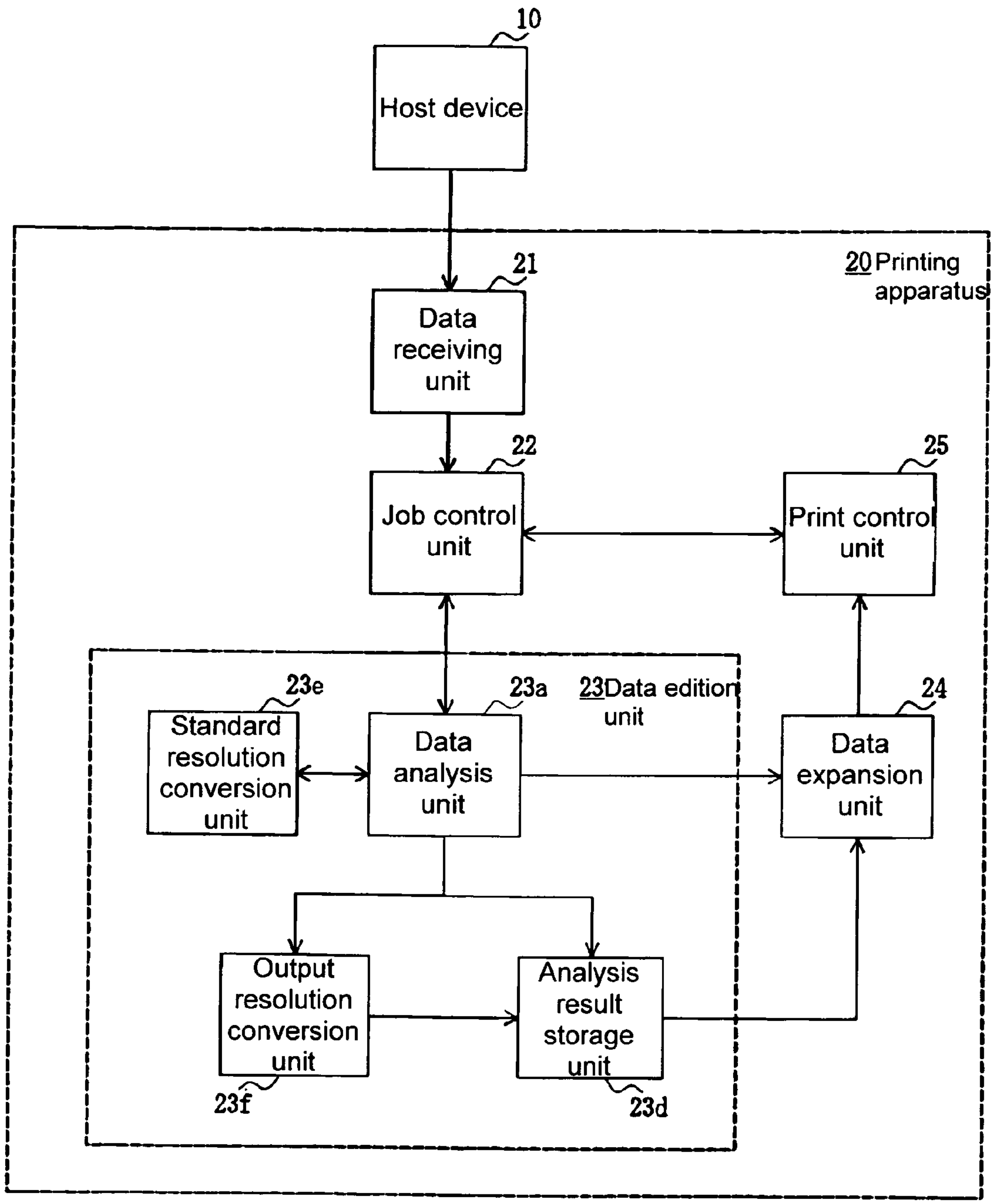
FIG. 9 is a block diagram showing a configuration of a printing apparatus according to a second embodiment of the present invention.

FIG. 9 is a block diagram showing a configuration of a printing apparatus according to the second embodiment of the present invention.

In the first embodiment, only the line having one pixel length included in the dashed line is corrected. In the second embodiment, when an output resolution is greater than the standard resolution, i.e., 600 dpi, a data analysis process is performed at a resolution less than the output resolution. Accordingly, it is possible to correct whole contents of an image.

As shown in FIG. 9, the data edition unit 23 of the printing apparatus 20 includes a standard resolution conversion unit 23*e* and an output resolution conversion unit 23*f*. When data are analyzed at a resolution greater than the standard resolution, the standard resolution conversion unit 23*e* converts coordinate data to values at the standard resolution. At the same time, the output resolution conversion unit 23*f* converts the coordinate data thus converted to coordinate data at an original output resolution. Other configurations are similar to those in the first embodiment, and explanations thereof are omitted.

Figure 10:
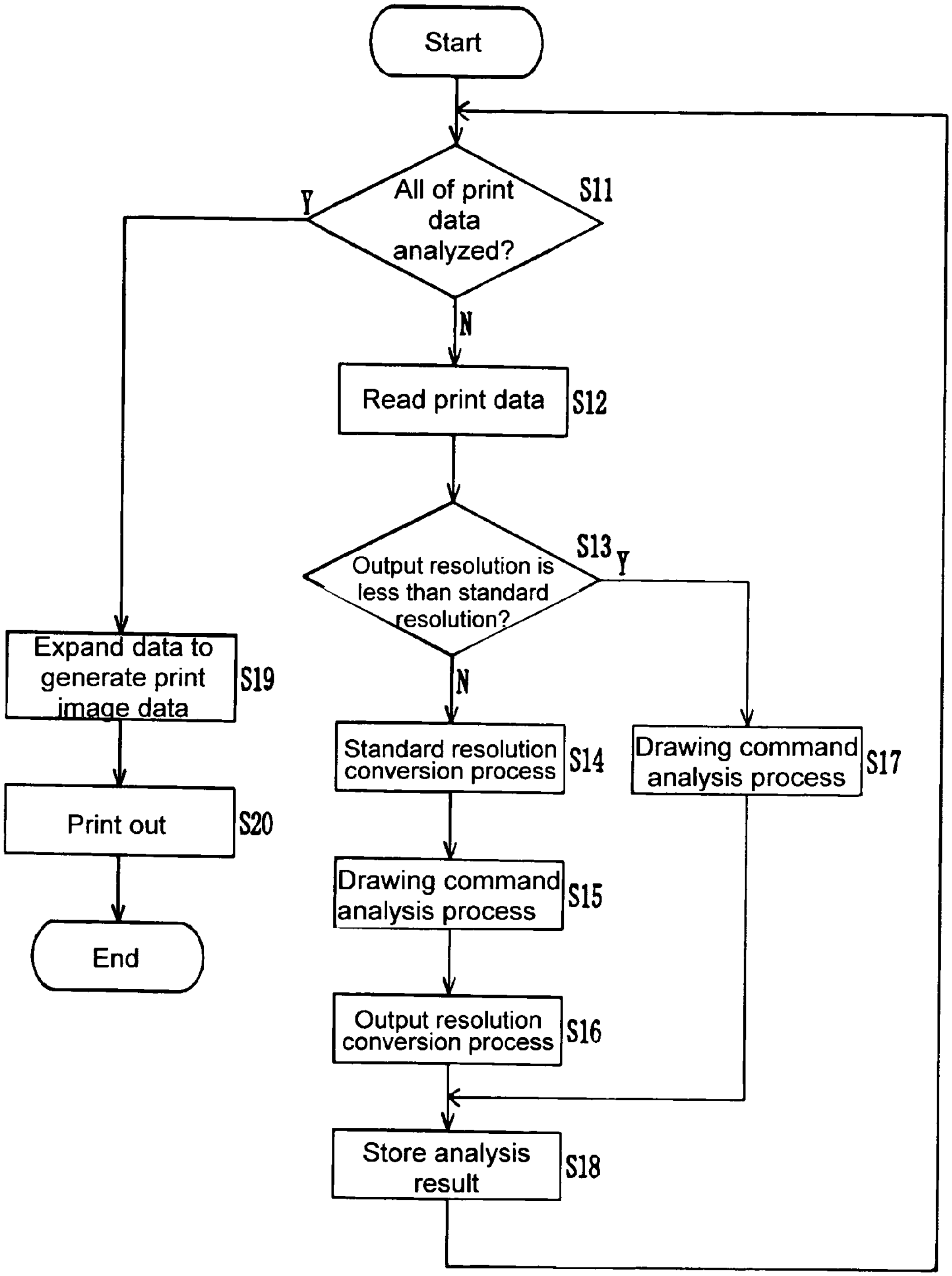
FIG. 10 is a flowchart showing an operation of a data edition unit and a data expansion unit according to the second embodiment of the present invention.

An operation of the printing apparatus 20 will be explained next. FIG. 10 is a flowchart showing an operation of the data edition unit 23 and the data expansion unit 24 according to the second embodiment of the present invention. A process up to that the job control unit 22 requests the data edition unit 23 to analyze the print data thus received is similar to that in the first embodiment, and an explanation thereof is omitted.

The operation of the data edition unit 23 and the data expansion unit 24 will be explained next. First, the data analysis unit 23*a* determines whether all of the print data thus received are analyzed. When all of the print data are not analyzed, the data analysis unit 23*a* reads the print data thus received per command.

In the next step, the data analysis unit 23*a* determines whether the output resolution currently specified is less than the standard resolution. It is supposed that the standard resolution, at which one pixel length is visually recognizable, is 600 dpi.

When the output resolution is less than the standard resolution, that is, the output resolution is 600 dpi, 300 dpi, and the likes, the data analysis unit 23*a* performs a drawing command analysis process, so that an analysis result is stored in the analysis result storage unit 23*d*.

When the output resolution is greater than the standard resolution, that is, the output resolution is 1200 dpi, 2400 dpi, and the likes, the standard resolution conversion unit 23*e* performs a standard resolution conversion process, so that the coordinate data corresponding to the output resolution are converted according to the standard resolution.

In the next step, the data analysis unit 23*a* performs the drawing command analysis process, and the output resolution conversion unit 23*f* performs an output resolution conversion process. Accordingly, the coordinate data corresponding to the standard resolution are converted according to the output resolution, and an analysis result after the conversion is stored in the analysis result storage unit 23*d*.

In the next step, the data analysis unit 23*a* determines one more time whether all of the print data thus received are analyzed. When all of the print data are not analyzed, the data analysis unit 23*a* repeats the steps described above until all of the print data are analyzed. When all of the print data are analyzed, the following process is similar to that in the first embodiment, and an explanation thereof is omitted.

The flowchart shown in FIG. 10 will be explained. In step S11, it is determined whether all of the print data are analyzed. When all of the print data are analyzed, the process proceeds to step S19. When all of the print data are not analyzed, the process proceeds to step S12.

In step S12, the print data are read per command. In step S13, it is determined whether the output resolution is less than the standard resolution. When it is determined that the output resolution is less than the standard resolution, the process proceeds to step S17. When it is determined that the output resolution is not less than the standard resolution, the process proceeds to step S14.

In step S14, the standard resolution conversion process is performed. In step S15, the drawing command analysis process is performed. In step S16, the output resolution conversion process is performed. In step S17, the output resolution conversion process is performed. In step S18, the analysis result is stored. In step S19, the data are expanded to generate the print image data. In step S20, the printing operation is performed, thereby completing the process.

Figure 11:
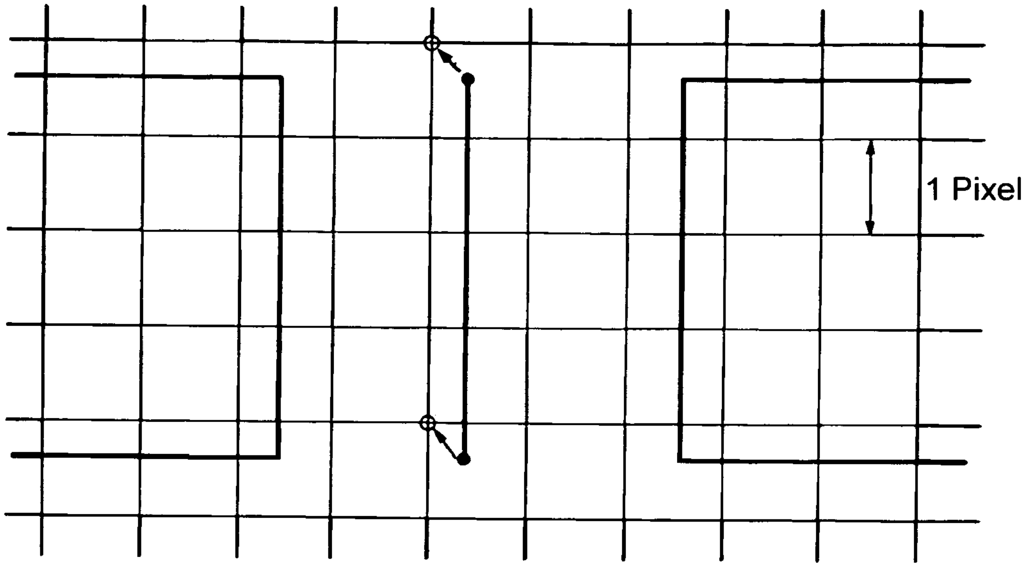
FIGS. 11(*a*) and 11(*b*) are schematic views showing a process of drawing an image at a standard resolution or the resolution of 600 dpi according to the second embodiment of the present invention, wherein FIG. 11(*a*) is a view showing a theoretical image according to a command, and FIG. 11(*b*) is a view showing an actual image thereof.
Figure 11:
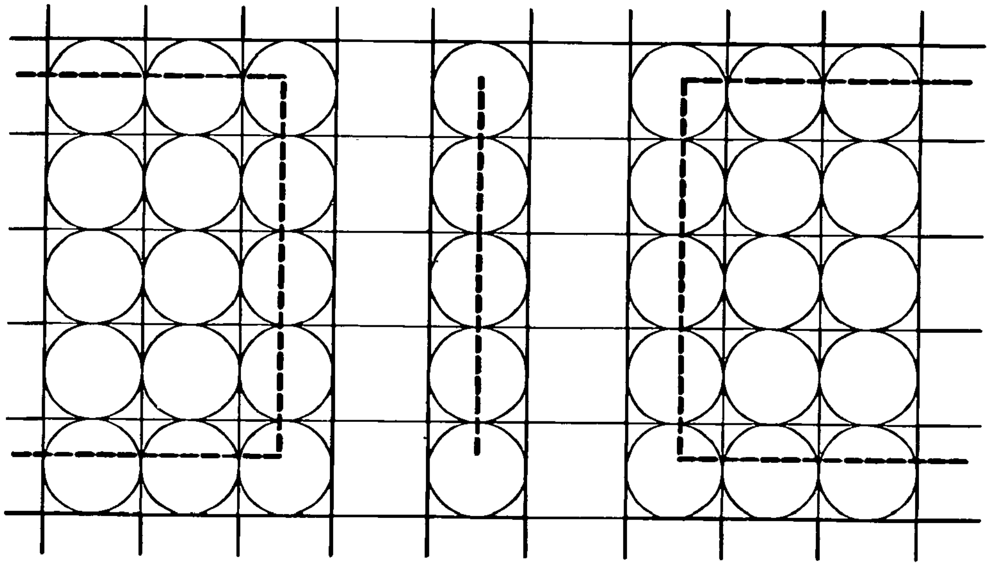

A print result will be explained next. FIGS. 11(*a*) and 11(*b*) are schematic views showing a process of drawing an image at the resolution of 600 dpi according to the second embodiment of the present invention. More specifically, FIG. 11(*a*) is a view showing a theoretical image, and FIG. 11(*b*) is a view showing an actual image thereof at the resolution of 600 dpi.

Figure 12:
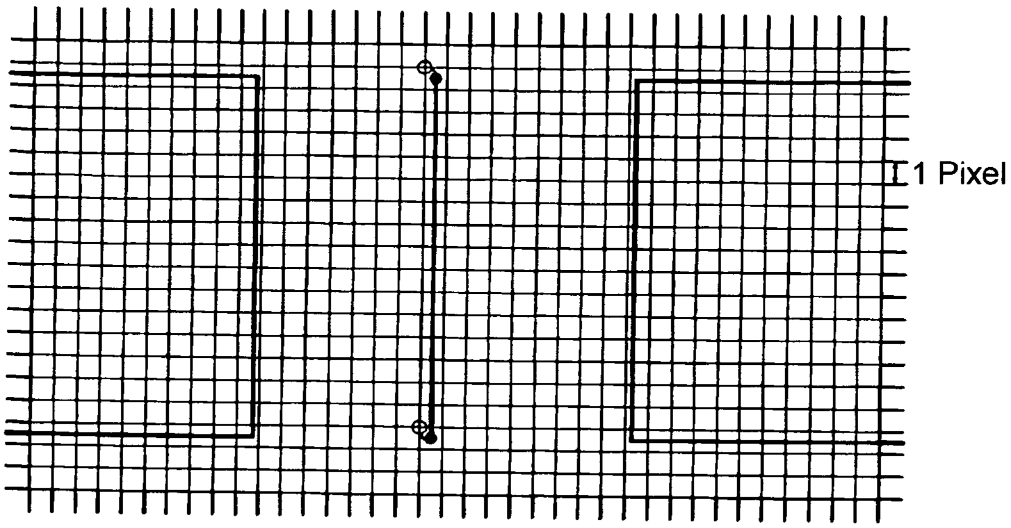
FIGS. 12(*a*) and 12(*b*) are schematic views showing a process of drawing an image at a resolution of 2400 dpi according to the second embodiment of the present invention, wherein FIG. 12(*a*) is a view showing a theoretical image according to a command, and FIG. 12(*b*) is a view showing an actual image thereof.
Figure 12:
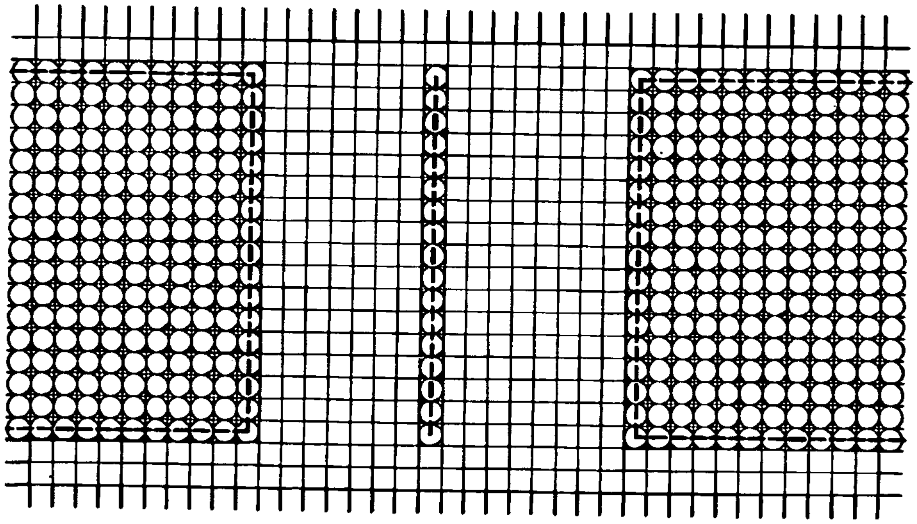

FIGS. 12(*a*) and 12(*b*) are schematic views showing a process of drawing an image at the resolution of 2400 dpi according to the second embodiment of the present invention. More specifically, FIG. 12(*a*) is a view showing a theoretical image according to a command, and FIG. 12(*b*) is a view showing an actual image thereof at the resolution of 2400 dpi.

Figure 13:
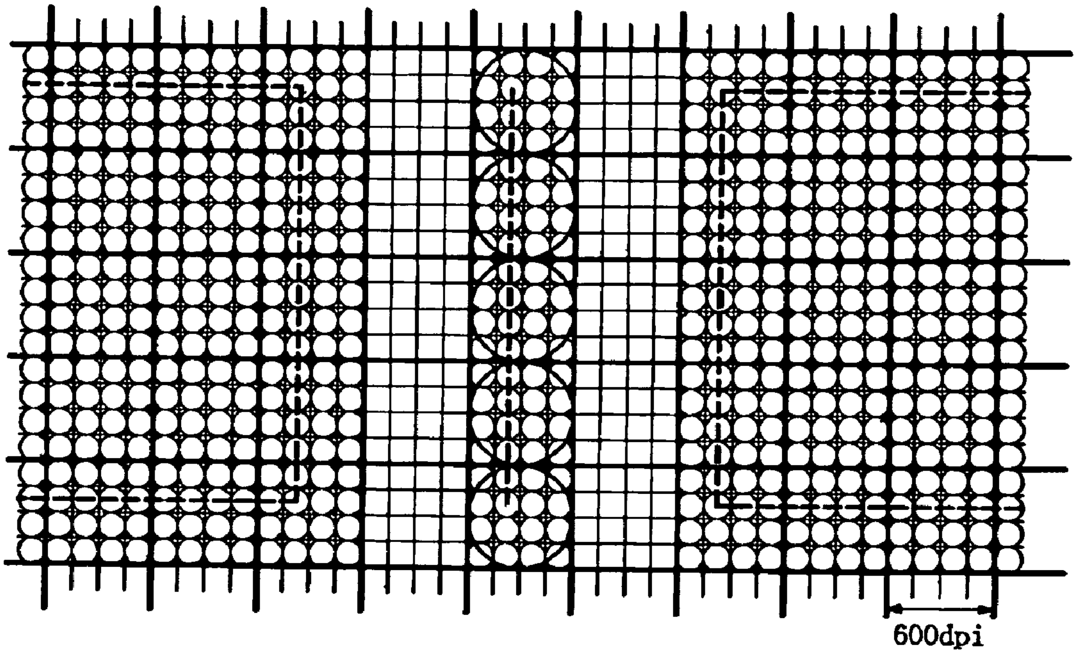
FIG. 13 is a schematic view showing an image corrected using a standard resolution according to the second embodiment of the present invention.
Figure 14:
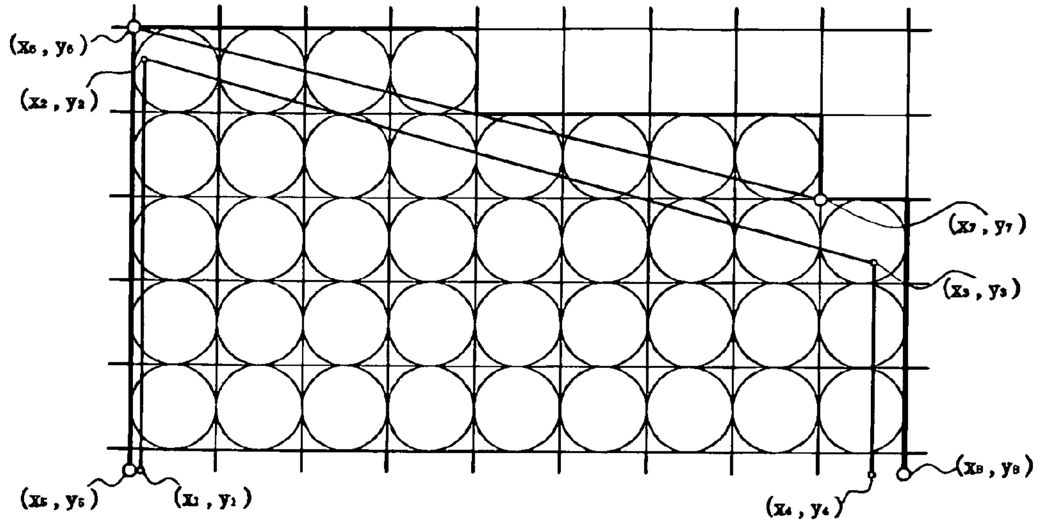
FIGS. 14(*a*) and 14(*b*) are schematic views showing a comparison between a low resolution and a high resolution according to the second embodiment of the present invention, wherein FIG. 14(*a*) is a view showing an actual image drawn at the resolution of 600 dpi, and FIG. 14(*b*) is a view showing an image corrected at the resolution of 2400 dpi using the standard resolution.
Figure 14:
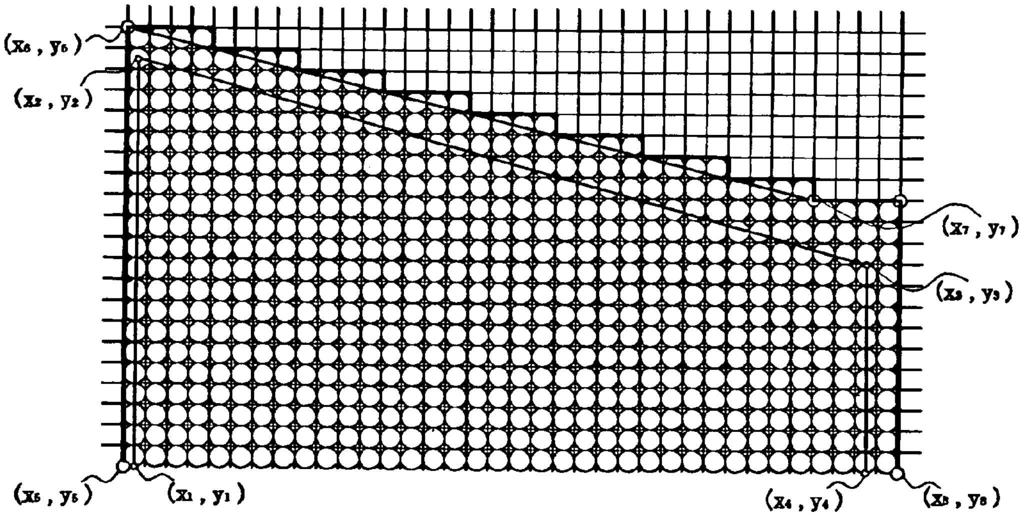

FIG. 13 is a schematic view showing an image corrected using the standard resolution according to the second embodiment of the present invention. FIGS. 14(*a*) and 14(*b*) are schematic views showing a comparison between a low resolution and a high resolution according to the second embodiment of the present invention. More specifically, FIG. 14(*a*) is a view showing an actual image drawn at the resolution of 600 dpi, and FIG. 14(*b*) is a view showing an image corrected at the resolution of 2400 dpi using the standard resolution.

As described above, FIGS. 11(*a*) and 11(*b*) are schematic views showing the process of drawing the image at the resolution of 600 dpi according to the second embodiment of the present invention. More specifically, FIG. 11(*a*) is a view showing the theoretical image, and FIG. 11(*b*) is a view showing the actual image thereof at the resolution of 600 dpi. The image is theoretically arranged as shown in FIG. 11(*a*). However, a minimum drawing unit is one pixel. Accordingly, the actual image is drawn slightly larger than the image specified according to a command.

As described above, FIGS. 12(*a*) and 12(*b*) are schematic views showing the process of drawing the image at the resolution of 2400 dpi according to the second embodiment of the present invention. More specifically, FIG. 12(*a*) is a view showing the theoretical image according to a command, and FIG. 12(*b*) is a view showing the actual image thereof at the resolution of 2400 dpi. In this case, the resolution is higher than 600 dpi, so that the actual image is closer to the theoretical image. However, the line having one pixel length at the center becomes too thin, and it is difficult to visually recognize.

According to the command specifying the resolution of 2400 dpi shown in FIG. 12(*a*), the dots are arranged as shown in FIG. 12(*b*). In the second embodiment, when the command specifies as shown in FIG. 12(*a*), the resolution is converted to 600 dpi as shown in FIG. 11(*a*). Accordingly, an area, where the dots are shifted shown in FIG. 11(*b*), is recognized as a line area, and the dots are arranged as shown in FIG. 13.

FIG. 13 is a schematic view showing the image corrected using the standard resolution according to the second embodiment of the present invention. As shown in FIG. 13, the coordinates are corrected according to the standard resolution. Accordingly, the line having one pixel length at the center has four pixels at the resolution of 2400 dpi, thereby obtaining a recognizable length. Note that there is no difference between the print results shown in FIG. 11(*b*) and FIG. 13. When an oblique line or a curved line is drawn, a difference occurs as shown in FIGS. 14(*a*) and 14(*b*).

FIG. 14(*a*) is a view showing the actual image drawn at the resolution of 600 dpi, and FIG. 14(*b*) is a view showing the image corrected at the resolution of 2400 dpi using the standard resolution. The coordinates of the images are identical in FIGS. 14(*a*) and 14(*b*). However, there is a difference in the output resolution, so that the oblique line in FIG. 14(*b*) becomes smoother.

In FIG. 14(*a*), the coordinate (x2, y2) is converted to the coordinate (x6, y6), and the coordinate (x3, y3) is converted to the coordinate (x7, y7). Other dots of the line are converted to dots at an upper left side in the area. Further, when an area has a dot at an upper left side thereof, a dot is formed in the area. When the dots are formed in the areas converted in FIG. 14(*a*), the image shown in FIG. 14(*b*) is obtained.

As described above, in the embodiment, the coordinates of the image are converted according to the standard resolution. Accordingly, when the dashed line including the line having one pixel length is drawn at the high resolution, it is possible to draw the oblique line or the curved line more smoothly as compared with the case of drawing at the standard resolution.

Third Embodiment

A third embodiment of the invention will be described next. Components in the third embodiment similar to those in the first and second embodiments are designated by the same reference numerals, and explanations thereof are omitted. Further, explanations of operations and effects in the third embodiment similar to those in the first and second embodiments are omitted.

Figure 15:
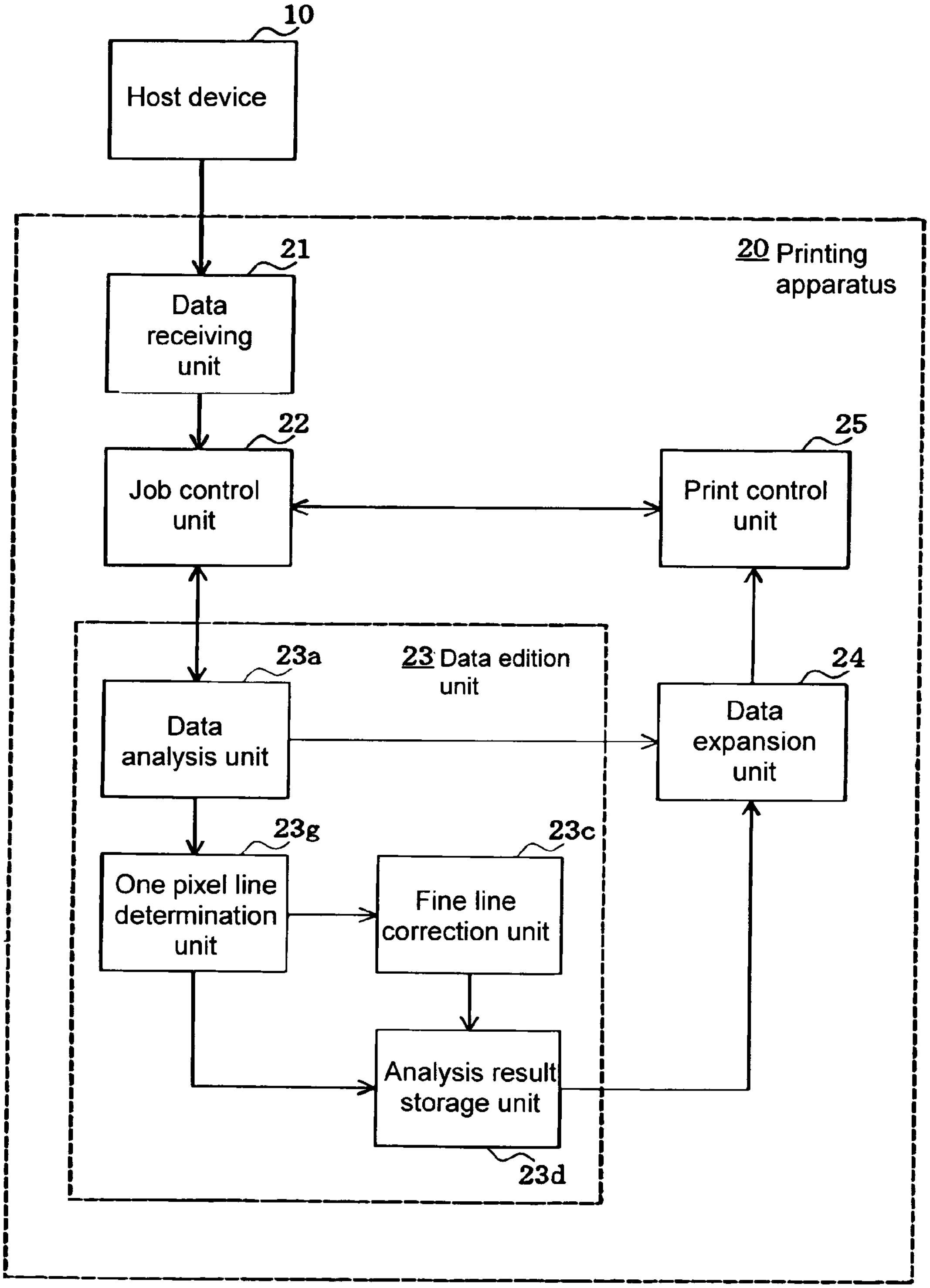
FIG. 15 is a block diagram showing a configuration of a printing apparatus according to a third embodiment of the present invention.

FIG. 15 is a block diagram showing a configuration of a printing apparatus according to the third embodiment of the present invention.

In the first embodiment, only the line having one pixel length included in the dashed line is corrected. However, an ordinary line or an ordinary image may contain a fine line to be corrected as well. In the third embodiment, a length and a width of a line are evaluated with respect to all of images to be drawn. Accordingly, it is possible to correct all fines lines in whole contents of the images to be drawn.

As shown in FIG. 15, the data edition unit 23 of the printing apparatus 20 includes a one pixel line determination unit 23*g*. The one pixel line determination unit 23*g* determines whether a line portion of an image analyzed has a width and a length corresponding to one pixel. Other configurations are similar to those in the first embodiment, and explanations thereof are omitted.

Figure 16:
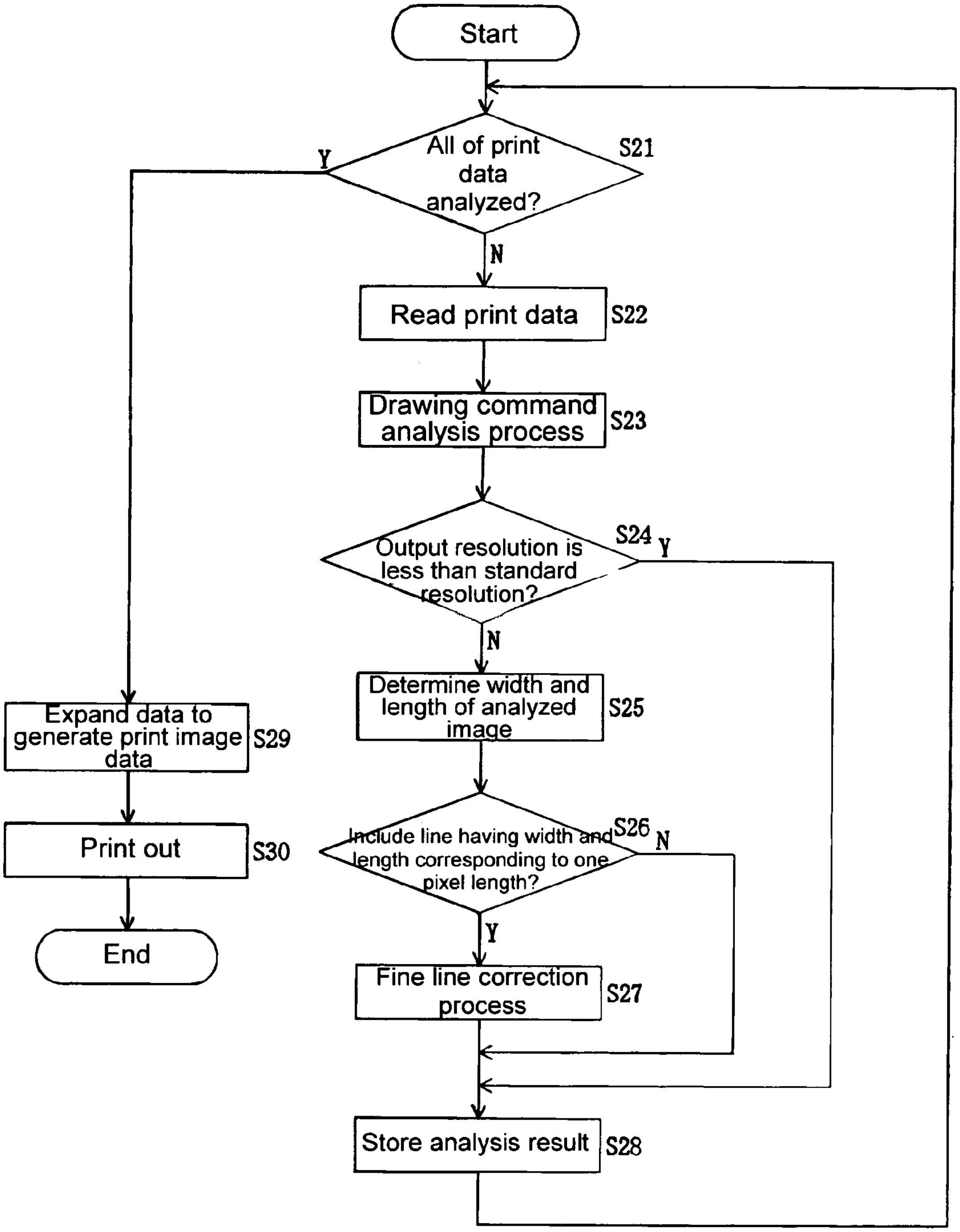
FIG. 16 is a flowchart showing an operation of a data edition unit and a data expansion unit according to the third embodiment of the present invention.

An operation of the printing apparatus 20 will be explained next. FIG. 16 is a flowchart showing an operation of the data edition unit 23 and the data expansion unit 24 according to the third embodiment of the present invention. A process up to that the job control unit 22 requests the data edition unit 23 to analyze the print data thus received is similar to that in the first embodiment, and an explanation thereof is omitted.

The operation of the data edition unit 23 and the data expansion unit 24 will be explained next. First, the data analysis unit 23*a* determines whether all of the print data thus received are analyzed. When all of the print data are not analyzed, the data analysis unit 23*a* reads the print data thus received per command.

In the next step, the data analysis unit 23*a* performs the drawing command analysis process, and determines whether the output resolution is less than the standard resolution. When the output resolution is less than the standard resolution, that is, the output resolution is 600 dpi, 300 dpi, and the likes, the data analysis unit 23*a* stores an analysis result in the analysis result storage unit 23*d*. When the output resolution is greater than the standard resolution, that is, the output resolution is 1200 dpi, 2400 dpi, and the likes, the one pixel line determination unit 23*g* determines a width and a length of the image thus analyzed to determine whether the image thus analyzed contains a line having a width and a length corresponding to one pixel.

When it is determined that the image does not contain a line having a width and a length corresponding to one pixel, an analysis result is stored in the analysis result storage unit 23*d*. When it is determined that the image contains a line having a width and a length corresponding to one pixel, the fine line correction unit 23*c* performs the fine line correction process, so that an analysis result is stored in the analysis result storage unit 23*d*.

In the next step, the data analysis unit 23*a* determines one more time whether all of the print data are analyzed. When all of the print data are not analyzed, the data analysis unit 23*a* repeats the steps described above until all of the print data are analyzed. When all of the print data are analyzed, the following process is similar to that in the first embodiment, and an explanation thereof is omitted.

The flowchart shown in FIG. 16 will be explained. In step S21, it is determined whether all of the print data are analyzed. When all of the print data are analyzed, the process proceeds to step S29. When all of the print data are not analyzed, the process proceeds to step S22.

In step S22, the print data are read per command. In step S23, the drawing command analysis process is performed. In step S24, it is determined whether the output resolution is less than the standard resolution. When it is determined that the output resolution is less than the standard resolution, the process proceeds to step S28. When it is determined that the output resolution is not less than the standard resolution, the process proceeds to step S25.

In step S25, the width and the length of the image thus analyzed are determined. In step S26, it is determined whether the image thus analyzed contains a line having a width and a length corresponding to one pixel length. When it is determined that the image thus analyzed contains the line having a width and a length corresponding to one pixel length, the process proceeds to step S27. When it is determined that the image thus analyzed does not contain the line having a width and a length corresponding to one pixel length, the process proceeds to step S28.

In step S28, the fine line correction process is performed. In step S29, the data are expanded to generate the print image data. In step S30, the printing operation is performed, thereby completing the process.

Figure 17:
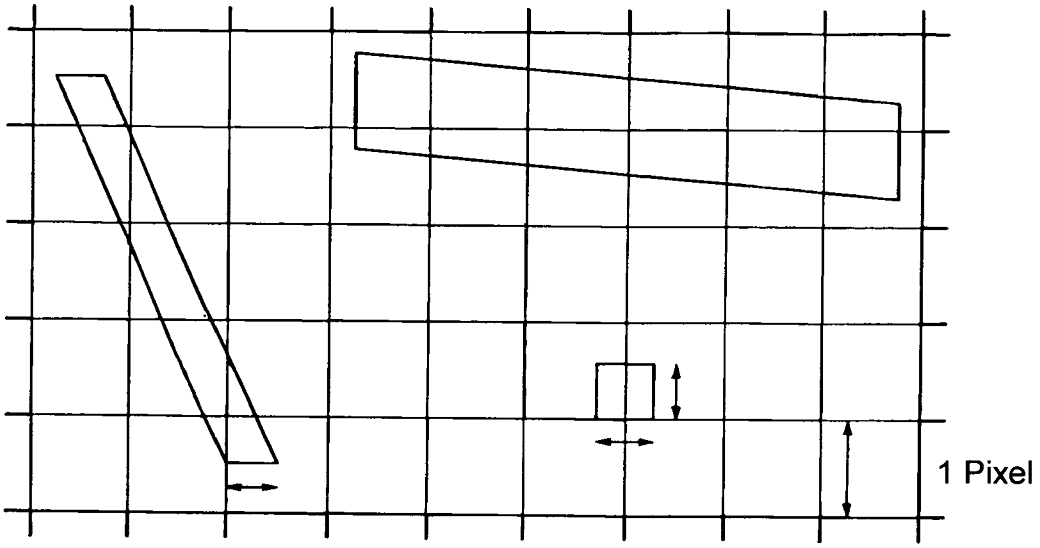
FIGS. 17(*a*) and 17(*b*) are schematic views showing a process of correcting images according to the third embodiment of the present invention, wherein FIG. 17(*a*) is a view showing the images before correction, and FIG. 17(*b*) is a view showing the images after correction.
Figure 17:
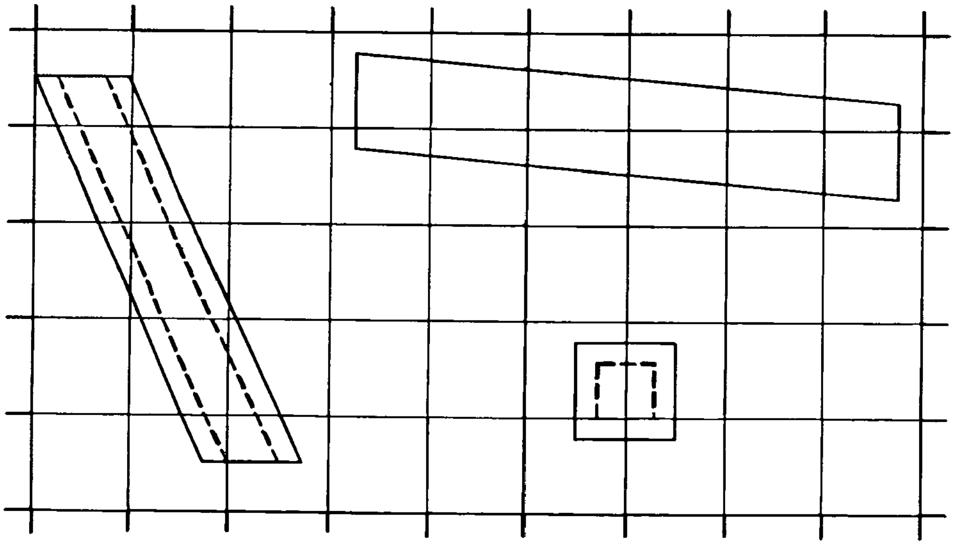

A process of correcting an image will be explained next. FIGS. 17(*a*) and 17(*b*) are schematic views showing the process of correcting the images according to the third embodiment of the present invention. More specifically, FIG. 17(*a*) is a view showing the images before correction, and FIG. 17(*b*) is a view showing the images after correction.

As shown in FIG. 17(*a*), the images before correction are shown. In this case, it is considered that the resolution is greater than the standard resolution. Accordingly, the images may contain a portion having a width and a length smaller than one pixel length according to the standard resolution. Based on coordinates of the images analyzed, it is determined whether the images contain a portion having a width and a length smaller than one pixel length with respect to each image.

In an example shown in FIG. 17(*a*), the image on left has a width smaller than one pixel length, and the image on lower right has a width and a length smaller than one pixel length. On the other hand, the image on upper right has a width and a length greater than one pixel length. Accordingly, the image on left and the image on lower right become subjects to correction.

In FIG. 17(*b*), the images after correction are shown. In the image on left, the width, that is, a coordinate in an X direction, is corrected, so that the width becomes equal to one pixel length at the standard resolution. In the image on lower right, the width and the length, that is, coordinates in the X direction and a Y direction, are corrected, so that the width and the length become equal to one pixel length at the standard resolution. Since the image on upper right has the width and the length greater than one pixel length, no correction is performed.

As described above, in the embodiment, in addition to the line having one pixel length in the dashed line, it is possible to correct all lines having the width and the length corresponding to one pixel length in the whole contents of the images.

Further, in the second embodiment, all of the coordinates in the whole contents of the images are corrected. On the other hand, in the third embodiment, it is possible to maintain the portion without correction at the original resolution, thereby increasing accuracy of the image.

Fourth Embodiment

A fourth embodiment of the invention will be described next. Components in the fourth embodiment similar to those in the first to third embodiments are designated by the same reference numerals, and explanations thereof are omitted. Further, explanations of operations and effects in the fourth embodiment similar to those in the first to third embodiments are omitted.

Figure 18:
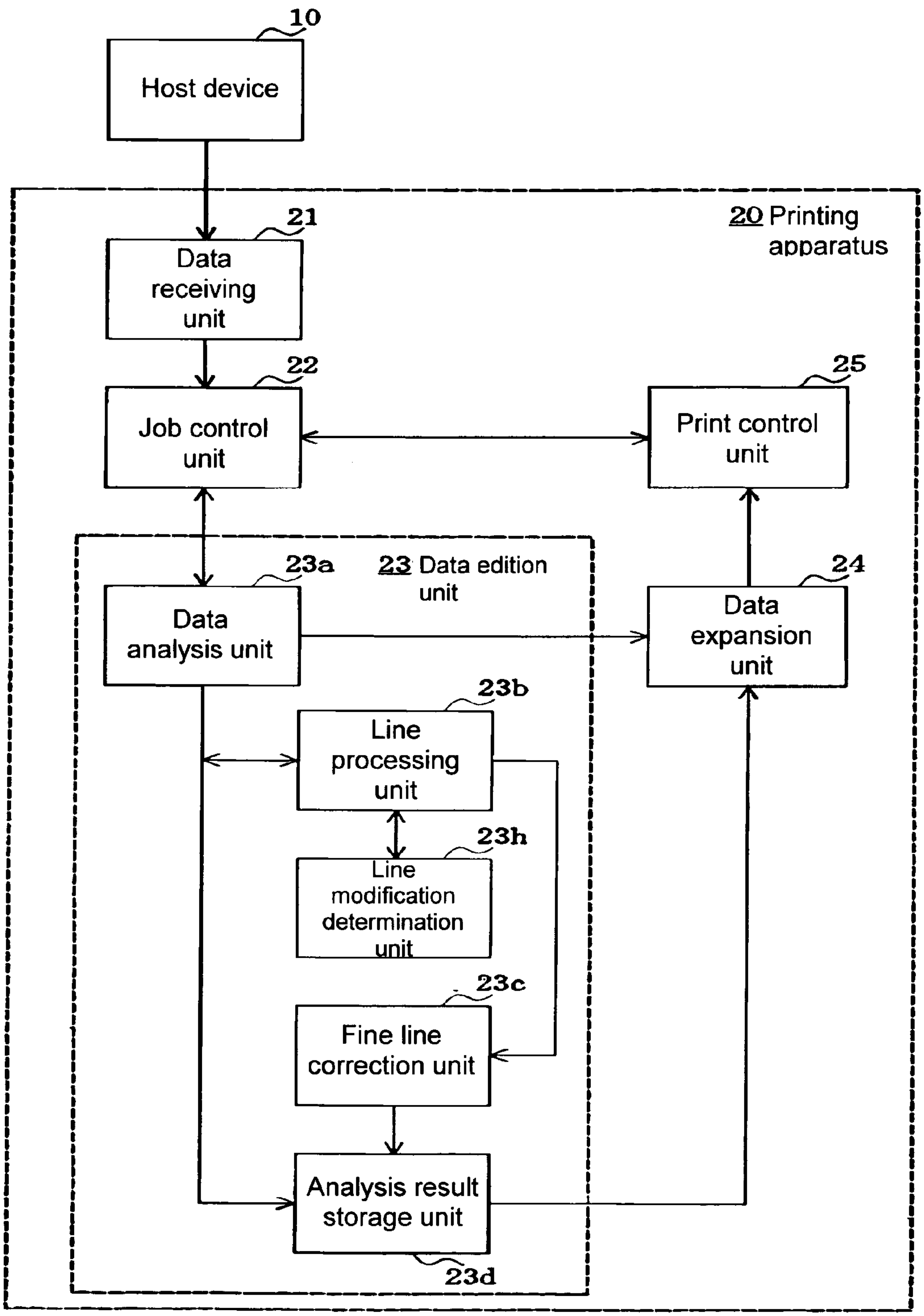
FIG. 18 is a block diagram showing a configuration of a printing apparatus according to a fourth embodiment of the present invention.

FIG. 18 is a block diagram showing a configuration of a printing apparatus according to the fourth embodiment of the present invention.

In the first embodiment, all of the lines having one pixel length included in the dashed line are corrected through the fine line correction process. However, when the dashed line is modified, and the line having one pixel length is modified, the line becomes visually recognizable. Accordingly, it is not necessary to correct the line.

As shown in FIG. 18, in the fourth embodiment, the data edition unit 23 of the printing apparatus 20 includes a line modification determination unit 23*h*. The line modification determination unit 23*h* determines whether the line having one pixel length is modified. When it is determined that the line having one pixel length is modified, it is possible to eliminate a redundant correction process. Other configurations are similar to those in the first embodiment, and explanations thereof are omitted.

Figure 19:
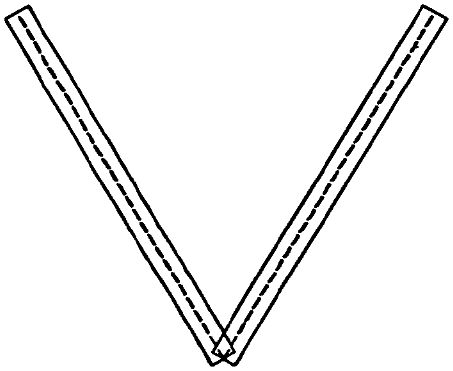
FIGS. 19(*a*) to 19(*c*) are schematic views showing a process of modifying an image according to the fourth embodiment of the present invention, wherein FIG. 19(*a*) is a view showing an actual image without modification, FIG. 19(*b*) is a view showing an image with modification called "Join", and FIG. 19(*c*) is a view showing an image with modification called "Cap"
Figure 19:
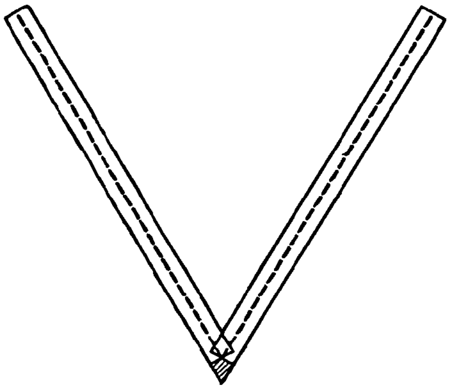
Figure 19:
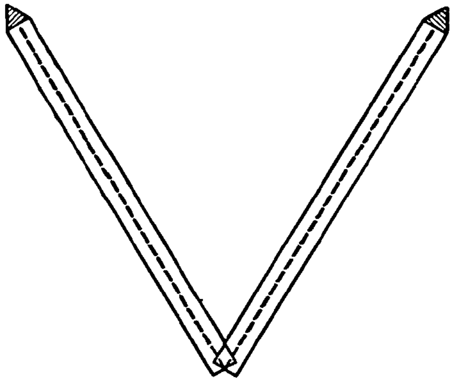

A process of modifying an image will be explained next. FIGS. 19(*a*) to 19(*c*) are schematic views showing the process of modifying the image according to the fourth embodiment of the present invention. More specifically, FIG. 19(*a*) is a view showing an actual image without modification, FIG. 19(*b*) is a view showing an image with modification called “Join”, and FIG. 19(*c*) is a view showing an image with modification called “Cap”.

As shown in FIGS. 19(*b*) and 19(*c*), types of modifications on an image include “Join” and “Cap”. As shown in FIG. 19(*b*), in “Join”, modification is applied to a portion where lines are connected. As shown in FIG. 19(*c*), in “Cap”, modification is applied to end portions of lines. In “Join” and “Cap”, a shape of modification includes a circular shape, a rectangular shape, and the likes, in addition to a triangular shape shown in FIGS. 19(*b*) and 19(*c*).

Figure 20:
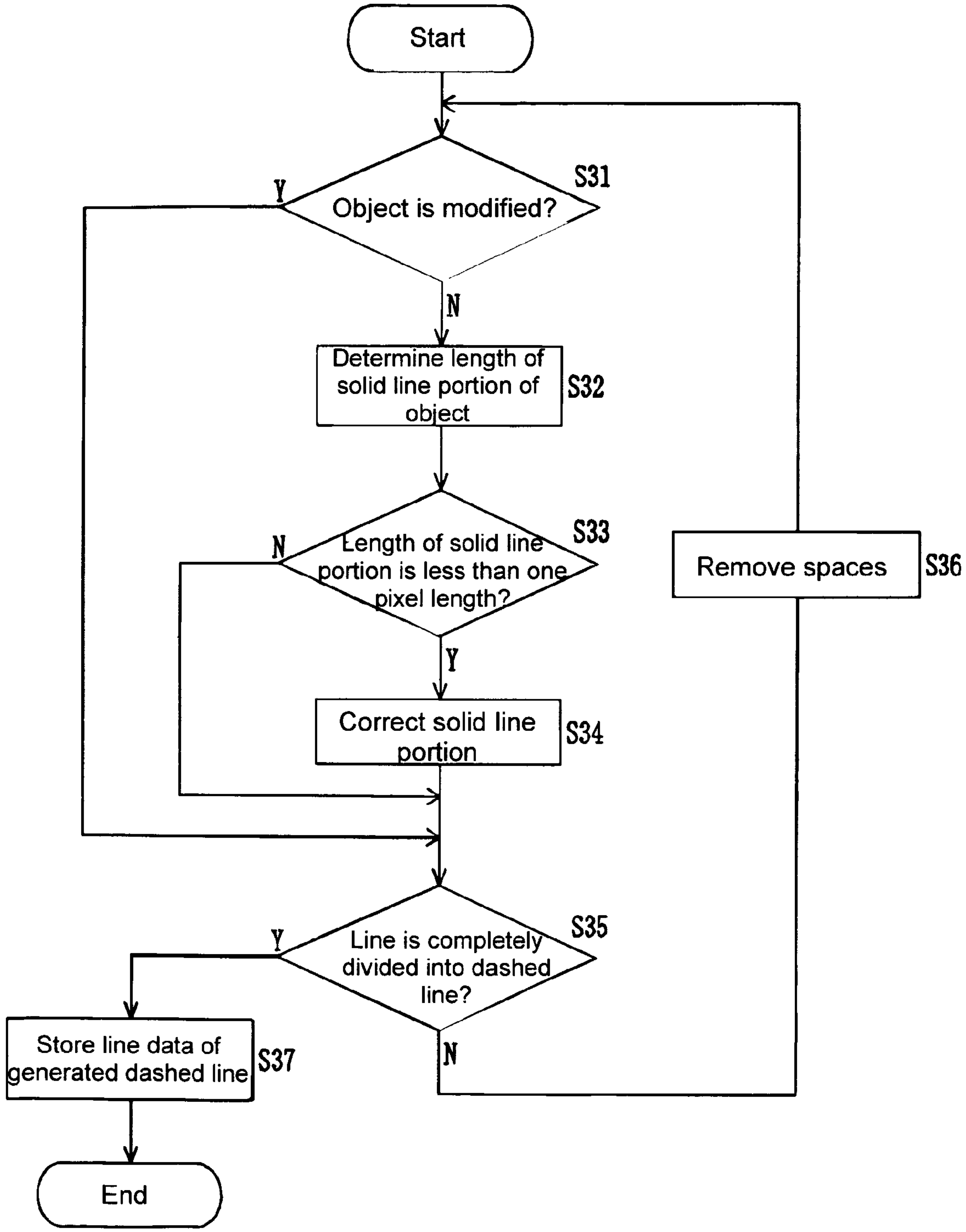
FIG. 20 is a flowchart showing a sub-routine of dividing a line and a fine line correction process according to the fourth embodiment of the present invention.

An operation of the printing apparatus 20 will be explained next. FIG. 20 is a flowchart showing a sub-routine of dividing the line and the fine line correction process according to the fourth embodiment of the present invention. An operation of the data edition unit 23 and the data expansion unit 24 according to the fourth embodiment is similar to that in the first embodiment shown in FIG. 3, and an explanation thereof is omitted. Further, when the line is not modified, the operation of dividing the line and the fine line correction process in the fourth embodiment is similar to that in the first embodiment, and an explanation thereof is omitted. When the line is modified, the operation of dividing the line and the fine line correction process is performed as explained below.

First, the line modification determination unit 23*h* determines whether an object, that is, a first solid line of the line to be divided, is modified. When the object is modified, it is not necessary to correct the object, and it is determined whether division of the line is completed. When the object is not modified, the line processing unit 23*b* determines a length of a solid line portion of the object, that is, a length of the first solid line of the line to be divided.

In the next step, it is determined whether the length of the solid line portion is less than one pixel length. When it is determined that the solid line portion is less than one pixel length, the fine line correction unit 23*c* corrects the solid line portion. When it is determined that the solid line portion is greater than one pixel length, the solid line portion is not corrected.

In the next step, it is determined whether the line is completely divided, that is, the line is completely divided into the dashed line. When it is determined that the line is not completely divided, adjacent spaces are removed. Then, it is determined whether an object is modified with respect to a next solid line portion, and the steps described above are repeated. When it is determined that the line is completely divided, line data of the dashed line thus generated are stored in the analysis result storage unit 23*d*.

The flow chart shown in FIG. 20 will be explained next. In step S31, it is determined whether the object is modified. When it is determined that the object is modified, the process proceeds to step S35. When it is determined that the object is not modified, the process proceeds to step S32.

In step S32, the length of the solid line portion of the object is determined. In step S33, it is determined whether the length of the solid line portion is less than one pixel length. When it is determined that the length of the solid line portion is less than one pixel length, the process proceeds to step S34. When it is determined that the length of the solid line portion is not less than one pixel length, the process proceeds to step S35.

In step S34, the solid line portion is corrected. In step S35, it is determined whether the line is completely divided into the dashed line. When it is determined that the line is completely divided into the dashed line, the process proceeds to step S37. When it is determined that the line is not completely divided into the dashed line, the process proceeds to step S36. In step S36, the spaces are removed. In step S37, the line data of the dashed line thus generated are stored, thereby completing the process.

Figure 21:
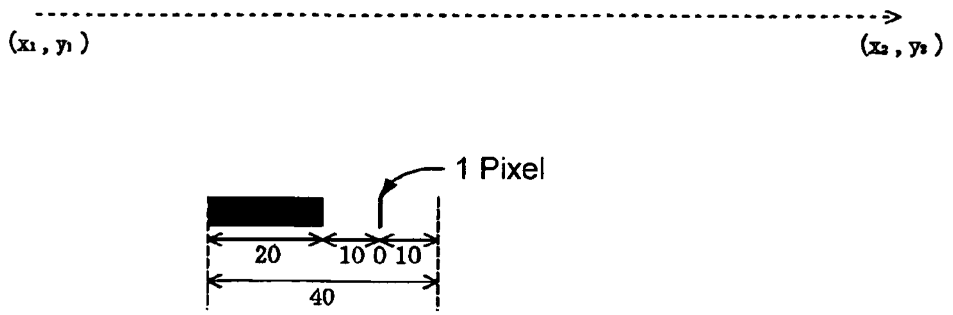
FIGS. 21(*a*) to 21(*c*) are schematic views showing lines drawn with the printing apparatus according to the fourth embodiment of the present invention, wherein FIG. 21(*a*) is a view showing information necessary for dividing a line, FIG. 21(*b*) is a view showing a line divided into a dashed line, and FIG. 21(*c*) is a view showing the dashed line with and without correction.
Figure 21:
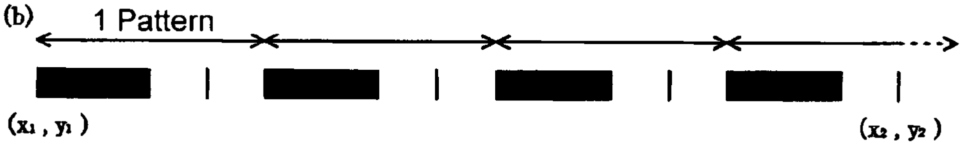
Figure 21:
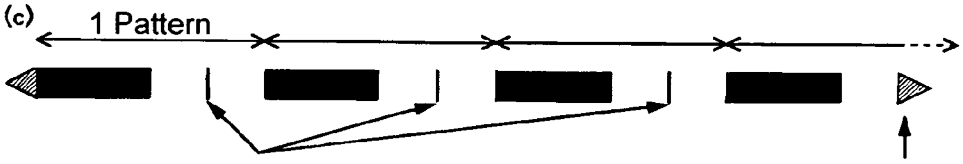

A relationship between division of the line and correction will be explained next. FIGS. 21(*a*) to 21(*c*) are schematic views showing lines drawn with the printing apparatus according to the fourth embodiment of the present invention. More specifically, FIG. 21(*a*) is a view showing information necessary for dividing the line, FIG. 21(*b*) is a view showing the line divided into the dashed line, and FIG. 21(*c*) is a view showing the dashed line with and without correction.

When the line is divided into the dashed line, the information shown in FIG. 21(*a*) is necessary. More specifically, the information includes a coordinate of a starting point of the line (x1, y1); a coordinate of an end point of the line (x2, y2); a length of one dashed line pattern; and a ratio of a solid line and a space of the dashed line pattern. Further, modification information is provided for determining whether the line is modified with "Join", "Cap", and the likes.

When the line is divided according to the information other than the modification information, the line is divided into the dashed line as shown in FIG. 21(*b*). As shown in FIG. 21(*b*), the solid line portion at the end point has one pixel length.

FIG. 21(*c*) is a view showing the dashed line with correction, i.e., "Cap". As shown in FIG. 21(*c*), three solid line portions having one pixel length from first to third from left need to be modified when the output resolution is greater than the standard resolution. On the other hand, the fourth solid line portion having one pixel length from left is modified with "Cap", and becomes visually recognizable without correction. Accordingly, it is possible to eliminate the correction process with respect to the fourth sold line portion.

As described above, in the fourth embodiment, it is determined whether the line is modified with "Join" and "Cap". In the first embodiment, all of the lines having one pixel length included in the dashed line are corrected through the fine line correction process. In the fourth embodiment, on the other hand, it is possible to eliminate a redundant correction process. Accordingly, in addition to making the line having one pixel length visually recognizable, it is possible to increase a processing speed.

Fifth Embodiment

A fifth embodiment of the invention will be described next. Components in the fifth embodiment similar to those in the first to fourth embodiments are designated by the same reference numerals, and explanations thereof are omitted. Further, explanations of operations and effects in the fifth embodiment similar to those in the first to fourth embodiments are omitted.

Figure 22:
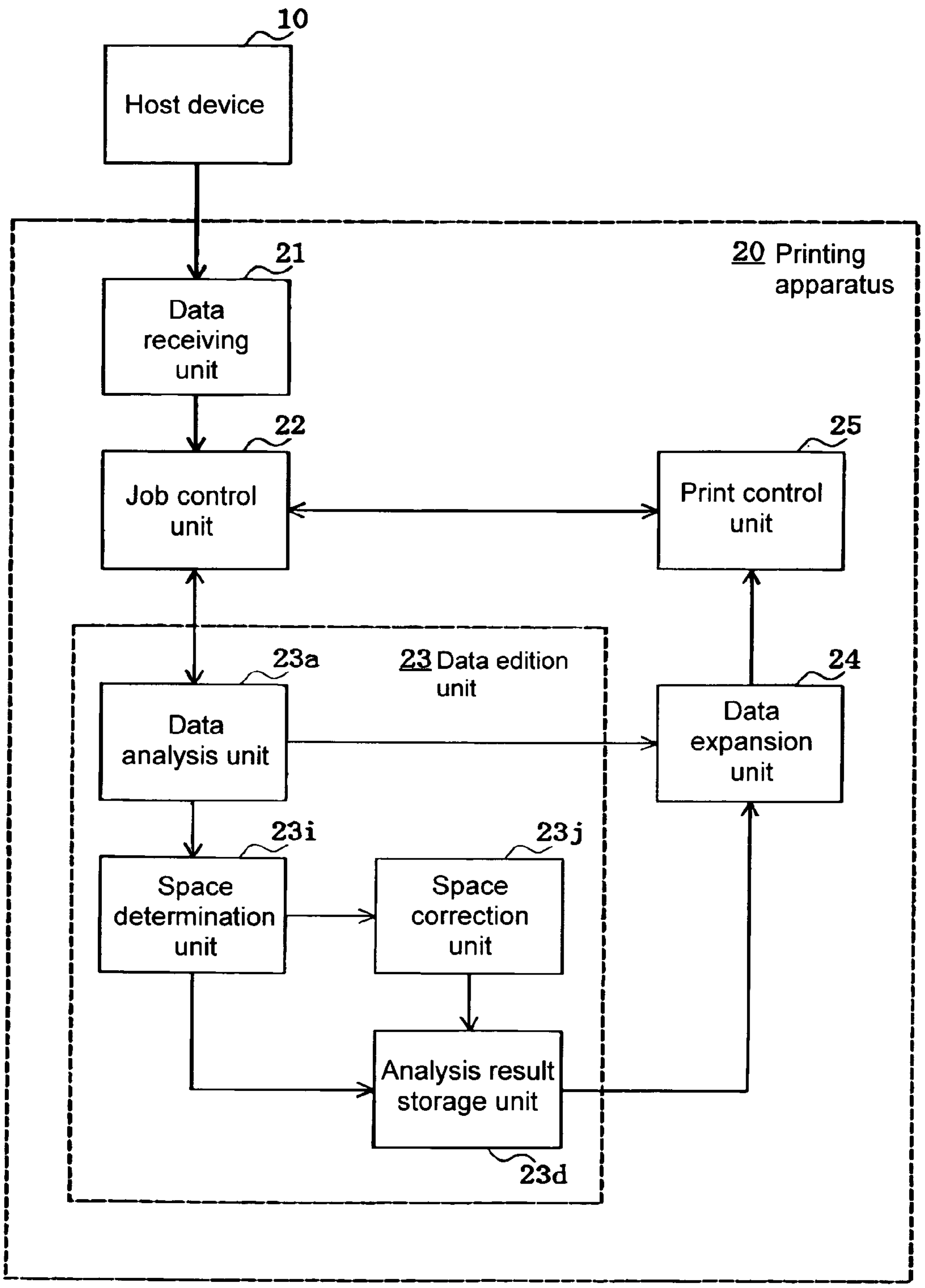
FIG. 22 is a block diagram showing a configuration of a printing apparatus according to a fifth embodiment of the present invention.

FIG. 22 is a block diagram showing a configuration of a printing apparatus according to the fifth embodiment of the present invention.

In the first embodiment, when the solid line portion of the dashed line has the length less than one pixel length, the solid line portion is corrected, so that the solid line portion becomes visually recognizable at the high resolution. However, at the high resolution, there may be a problem of not recognizing the space having one pixel width and one pixel length, in addition to the solid line portion. In the fifth embodiment, the space is corrected as well. Accordingly, it is possible to prevent the space from being crashed and becoming visually unrecognizable.

As shown in FIG. 22, the data edition unit 23 of the printing apparatus 20 includes a space determination unit 23*i* and a space correction unit 23*j*. The space determination unit 23*i* determines whether the space of the dashed line has a length less than one pixel length at the standard resolution. The space correction unit 23*j* enlarges the space of the dashed line to one pixel length. Other configurations are similar to those in the first embodiment, and explanations thereof are omitted.

Figure 23:
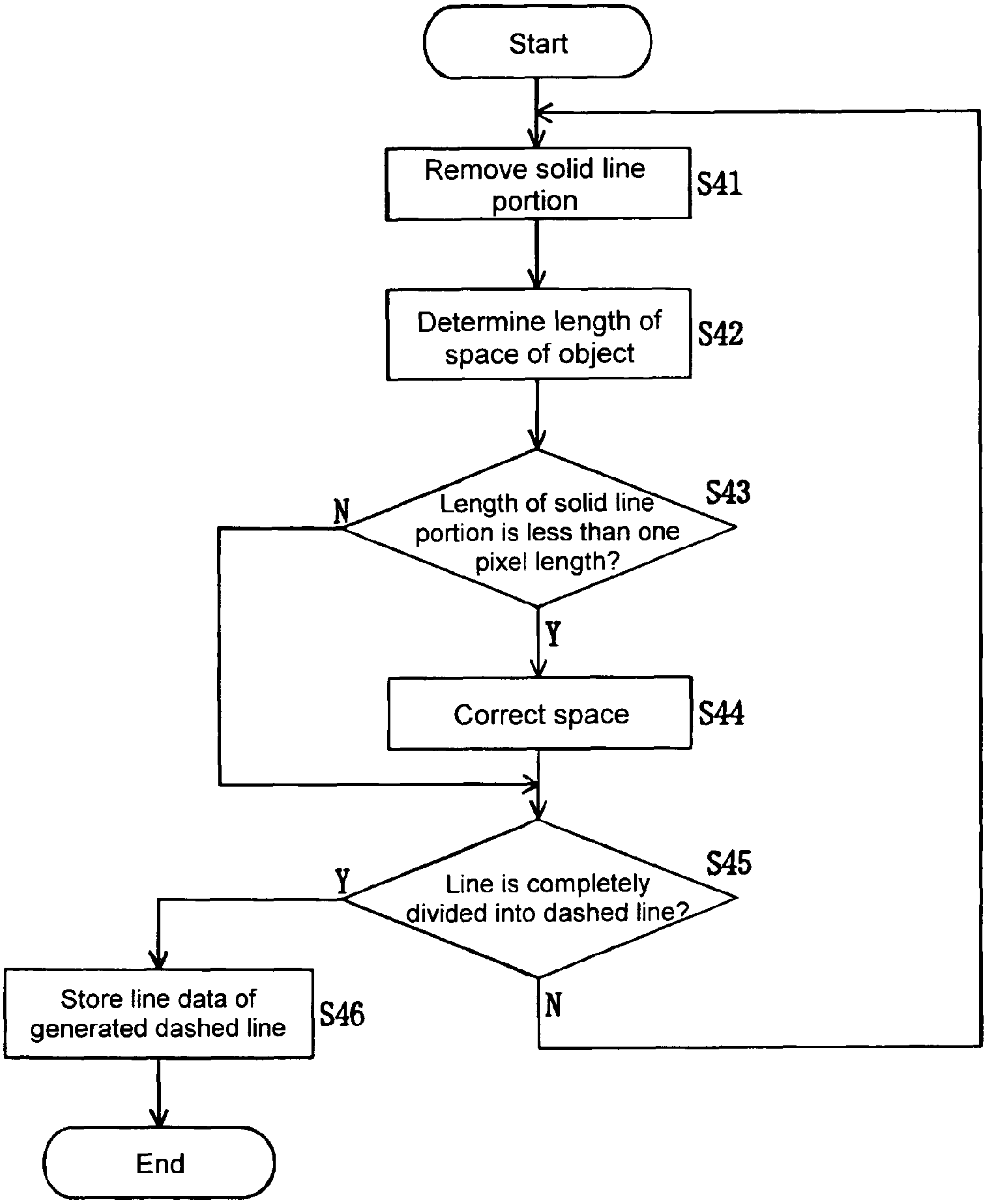
FIG. 23 is a flowchart showing a sub-routine of dividing a line and a fine line correction process according to the fifth embodiment of the present invention.

An operation of the printing apparatus 20 will be explained next. FIG. 23 is a flowchart showing a sub-routine of dividing the line and the fine line correction process according to the fifth embodiment of the present invention. An operation of the data edition unit 23 and the data expansion unit 24 according to the fifth embodiment is similar to that in the first embodiment shown in FIG. 3, and an explanation thereof is omitted. Instead of the process of dividing the line and the fine line correction process in the first embodiment, a process of dividing the line and a space correction process are performed in the fifth embodiment.

In the process of dividing the line and the space correction process, since the object to be corrected is the space, the solid line portion, i.e., the first line portion, is removed. Then, the length of the space is determined. The space determination unit 23*i* determines whether the length of the space is less than one pixel length at the standard resolution. When the length of the space is less than one pixel length, the space correction unit 23*j* corrects the space. When the length of the space is greater than one pixel length, the space is not corrected.

In the next step, it is determined whether the line is completely divided, that is, the line is completely divided into the dashed line. When it is determined that the line is not completely divided, the solid line portion is removed one more time, and the steps described above are repeated. When it is determined that the line is completely divided, line data of the dashed line thus generated are stored in the analysis result storage unit 23*d*.

The flow chart shown in FIG. 23 will be explained next. In step S41, the solid line portion is removed. In step S42, the length of the space of the object is determined. In step S31, it is determined whether the length of the space is less than one pixel length at the standard resolution. When it is determined that the length of the space is less than one pixel length at the standard resolution, the process proceeds to step S44. When it is determined that the length of the space is not less than one pixel length at the standard resolution, the process proceeds to step S45.

In step S44, the space is corrected. In step S45, it is determined whether the line is completely divided into the dashed line. When it is determined that the line is completely divided into the dashed line, the process proceeds to step S46. When it is determined that the line is not completely divided into the dashed line, the process returns to step S41. In step S46, the line data of the dashed line thus generated are stored, thereby completing the process.

Figure 24:
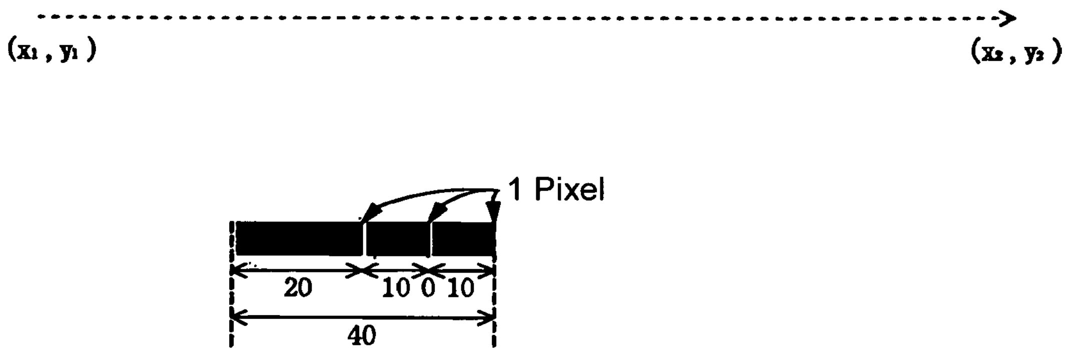
FIGS. 24(*a*) and 24(*b*) are schematic views showing a process of diving a line including spaces having one pixel length according to the fifth embodiment of the present invention, wherein FIG. 24(*a*) is a view showing information necessary for dividing the line, and FIG. 24(*b*) is a view showing the line including the spaces having one pixel length.
Figure 24:
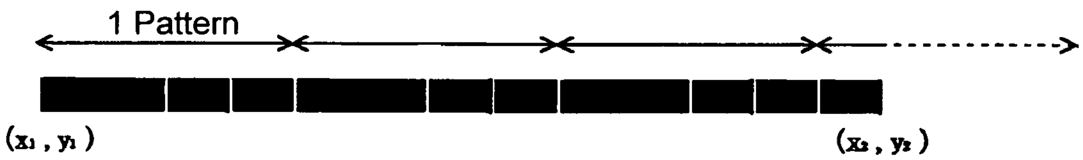

A process of diving the line including the space having one pixel length into the dashed line will be explained next. FIGS. 24(*a*) and 24(*b*) are schematic views showing the process of diving the line including the spaces having one pixel length according to the fifth embodiment of the present invention. More specifically, FIG. 24(*a*) is a view showing information necessary for dividing the line, and FIG. 24(*b*) is a view showing the line including the spaces having one pixel length.

Figure 25:
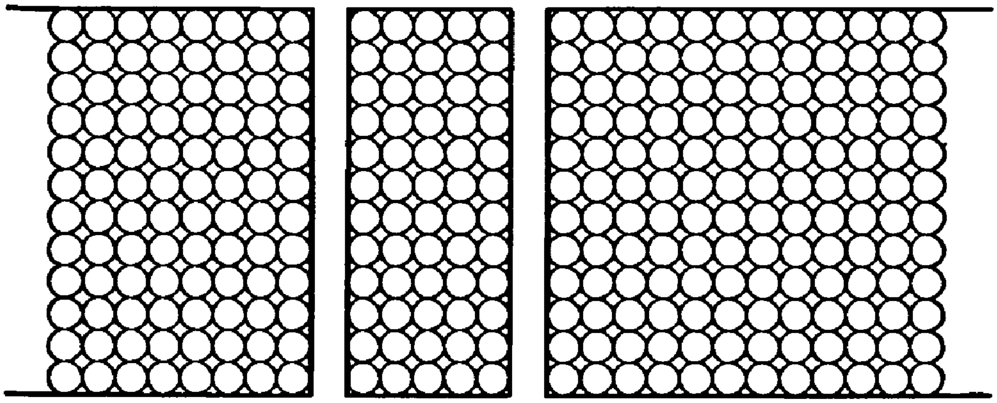
FIGS. 25(*a*) and 25(*b*) are schematic views showing a process of correcting a dashed line including spaces having one pixel length according to the fifth embodiment of the present invention, wherein FIG. 25(*a*) is a schematic enlarged view showing the dashed line before correction, and FIG. 25(*b*) is a schematic enlarged view showing the dashed line after correction.
Figure 25:
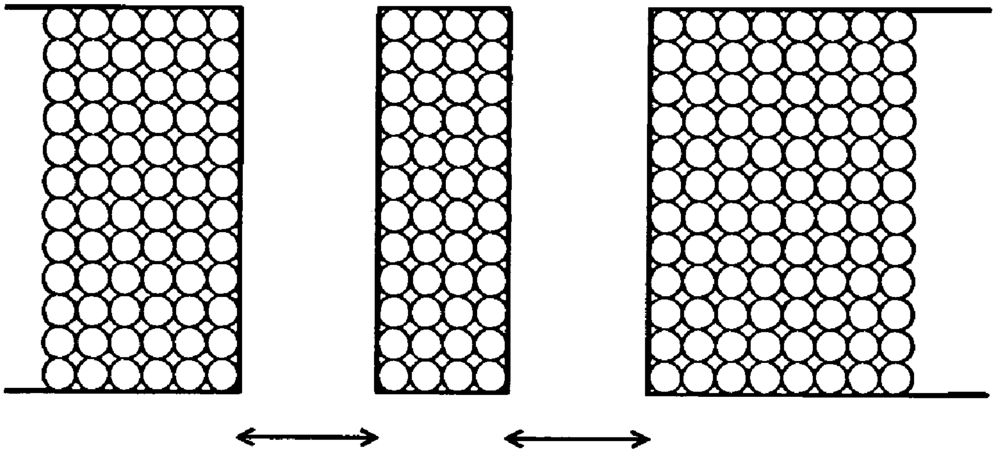

FIGS. 25(*a*) and 25(*b*) are schematic views showing a process of correcting the dashed line including the spaces having one pixel length according to the fifth embodiment of the present invention. More specifically, FIG. 25(*a*) is a schematic enlarged view showing the dashed line before correction, and FIG. 25(*b*) is a schematic enlarged view showing the dashed line after correction.

When the line is divided into the dashed line, the information shown in FIG. 24(*a*) is necessary. More specifically, the information includes a coordinate of a starting point of the line (x1, y1); a coordinate of an end point of the line (x2, y2); a length of one dashed line pattern; and a ratio of the solid line and the space of the dashed line pattern. In this case, the length of the spaces is represented as 0%.

When the line is divided into the dashed line, the dashed line shown in FIG. 24(*b*) is obtained. In this case, since the length of the spaces is represented as 0%, the spaces have one pixel length at the output resolution.

In the embodiment, the dashed line including the spaces having one pixel length is obtained before correction as shown in FIG. 25(*a*). Note that theoretically the spaces having one pixel length are created. In actual image, however, the spaces are crashed and become visually unrecognizable. Accordingly, the spaces are corrected as shown in FIG. 25(*b*). As shown in FIG. 25(*b*), the spaces are extended to one pixel length at the standard resolution. Accordingly, it is possible to make the space visually recognizable in the actual image.

As described above, in the embodiment, the spaces are corrected. Accordingly, when the dashed line including the spaces having one pixel length is drawn, it is possible to prevent the spaces from being crashed and becoming visually unrecognizable.

In the first to fifth embodiment described above, the fine line and the space are always corrected. Alternatively, it is possible to switch whether correction is performed through setting a menu to on or off. Further, the image forming apparatus analyzes the drawing command and forms the print image data. Alternatively, the image forming apparatus may receive the print image data from the host device, so that the image forming apparatus forms the print image data. In this case, the host device generates the print image according to the first to fifth embodiments of the present invention.

The disclosure of Japanese Patent Application No. 2007-041565, filed on Feb. 22, 2007 is incorporated in the application by reference.

While the invention has been explained with reference to the specific embodiments of the invention, the explanation is illustrative and the invention is limited only by the appended claims.

What is claimed is:

1. An image forming apparatus, comprising:

a data receiving unit for receiving print data from a host device;

a job control unit for controlling edition, expansion, and print control of the image data;

a data edition unit for editing the print data, said data edition unit determining whether a dashed line drawing command exists so that the data edition unit determines a length of a specific portion of a dashed line when the dashed line drawing command exists, said data edition unit performing a correction process and increasing the length of the specific portion up to a specific length when the length of the specific portion is smaller than the specific length, said data edition unit determining a length of a space of the dashed line when the dashed line drawing command exists so that the data edition unit performs the correction process and increases the length of the space up to the specific length when the length of the space is smaller than the specific length;

a data expansion unit for receiving an analytical result from the data edition unit and generating print image data; and a print control unit for receiving the print image data and controlling a printing unit to perform a printing operation, wherein said data edition unit is adapted to increase the length of the space up to the specific length equal to one pixel when the printing unit performs the printing operation at a resolution of 600 dpi.

2. The image forming apparatus according to claim 1, wherein said data edition unit is adapted to determine whether the specific portion is modified so that the data edition unit does not perform the correction process and does not increase the length of the specific portion when the specific portion is modified.

3. The image forming apparatus according to claim 1, wherein said data edition unit is adapted to determine coordinates of a starting point and an end point of the dashed line so that the data edition unit determines a direction that the dashed line extends according to the coordinates.

4. The image forming apparatus according to claim 3, wherein said data edition unit is adapted to perform the correction process and increase the length of the specific portion along the direction that the dashed line extends.

5. The image forming apparatus according to claim 1, wherein said data edition unit is adapted to not perform the correction process when the printing unit performs the printing operation at a resolution smaller than a specific resolution.

6. The image forming apparatus according to claim 1, wherein said data edition unit is adapted to increase the length of the space up to the specific length by substituting an adjacent image with the space.

7. The image forming apparatus according to claim 1, wherein said data edition unit is adapted to perform the correction process only when the data receiving unit receives the print data including dashed line data.

* * * * *